US011979809B2

(12) United States Patent
Petersen

(10) Patent No.: US 11,979,809 B2
(45) Date of Patent: May 7, 2024

(54) APPARATUS AND METHODS FOR PREMISES DEVICE EXISTENCE AND CAPABILITY DETERMINATION

(71) Applicant: Charter Communications Operating, LLC, St. Louis, MO (US)

(72) Inventor: Matthew Petersen, Highlands Ranch, CO (US)

(73) Assignee: CHARTER COMMUNICATIONS OPERATING, LLC, St. Louis, MO (US)

( * ) Notice: Subject to any disclaimer, the term of this patent is extended or adjusted under 35 U.S.C. 154(b) by 295 days.

(21) Appl. No.: 17/216,548

(22) Filed: Mar. 29, 2021

(65) Prior Publication Data

US 2021/0274333 A1 Sep. 2, 2021

Related U.S. Application Data

(63) Continuation of application No. 15/821,218, filed on Nov. 22, 2017, now Pat. No. 10,966,073.

(51) Int. Cl.
*H04W 4/80* (2018.01)
*H04L 41/12* (2022.01)
(Continued)

(52) U.S. Cl.
CPC ............... *H04W 4/80* (2018.02); *H04L 41/12* (2013.01); *H04L 69/18* (2013.01); *H04W 4/70* (2018.02);
(Continued)

(58) Field of Classification Search
CPC ......... H04W 4/80; H04W 4/70; H04W 8/005; H04W 56/001; H04W 84/12; H04L 41/12; H04L 69/18
See application file for complete search history.

(56) References Cited

U.S. PATENT DOCUMENTS 5,793,410 A 8/1998 Rao
6,192,403 B1 2/2001 Jong et al.
(Continued)

FOREIGN PATENT DOCUMENTS

EP 1046259 B1 3/2005
JP 2009135880 A 6/2009
(Continued)

OTHER PUBLICATIONS

Allen, et al., The Case for Run-Time Types in Generic Java, Rice University 2002 pp. 1-6.

*Primary Examiner* — Walter J Divito
*Assistant Examiner* — Anthony Luo
(74) *Attorney, Agent, or Firm* — Patent Beach PC

(57) ABSTRACT

Apparatus and methods for premises device identification and characterization. In one embodiment, the premises devices are IoT ("internet of things") devices having wireless interfaces, and the disclosed apparatus and methods "passively" canvass or assess a given premises as to its IoT profile, including both transparent and proxy-managed installations via a software-defined radio (SDR) device incorporated into a host device at the premises (e.g., DOCSIS modem, DSTB, wireless AP/router, or gateway). The SDR is controlled by logic operative to run on the host device (and optionally a network-side process), enabling the SDR to scan the RF environment within the premises in particular frequency bands typically associated with IoT devices and protocols. Information regarding each particular device is transmit to a network-side management process for use in populating the user's cloud-based EPG, selectively targeting advertising or other content to the premises, or yet other functions.

21 Claims, 22 Drawing Sheets

(51) Int. Cl.
  *H04L 67/12* (2022.01)
  *H04L 69/18* (2022.01)
  *H04W 4/70* (2018.01)
  *H04W 8/00* (2009.01)
  *H04W 56/00* (2009.01)
  *H04W 84/12* (2009.01)

(52) U.S. Cl.
  CPC ......... *H04W 8/005* (2013.01); *H04W 56/001* (2013.01); *H04L 67/12* (2013.01); *H04W 84/12* (2013.01)

(56) References Cited

U.S. PATENT DOCUMENTS

| | | |
|---|---|---|
| 6,216,152 B1 | 4/2001 | Wong et al. |
| 6,252,964 B1 | 6/2001 | Wasilewski et al. |
| 6,542,730 B1 | 4/2003 | Hosain |
| 6,542,739 B1 | 4/2003 | Garner |
| 6,546,419 B1 | 4/2003 | Humpleman et al. |
| 6,594,699 B1 | 7/2003 | Sahai et al. |
| 6,728,269 B1 | 4/2004 | Godwin et al. |
| 6,948,183 B1 | 9/2005 | Peterka |
| 6,968,364 B1 | 11/2005 | Wong et al. |
| 6,985,934 B1 | 1/2006 | Armstrong et al. |
| 7,058,964 B2 | 6/2006 | Khandelwal et al. |
| 7,068,597 B1 | 6/2006 | Fijolek et al. |
| 7,103,906 B1 | 9/2006 | Katz et al. |
| 7,159,230 B2 | 1/2007 | Manson et al. |
| 7,324,003 B2 | 1/2008 | Yun |
| 7,487,534 B1 | 2/2009 | Peterka et al. |
| 7,552,450 B1 | 6/2009 | Evans et al. |
| 7,617,516 B2 | 11/2009 | Huslak et al. |
| 7,936,254 B2 | 5/2011 | McClenny et al. |
| 8,519,860 B2 | 8/2013 | Johnson et al. |
| 8,547,876 B1 * | 10/2013 | Clement ............... H04W 8/005 370/336 |
| 8,649,768 B1 * | 2/2014 | Gaddam ................ H04M 3/38 455/414.1 |
| 8,653,963 B2 | 2/2014 | Vallaire |
| 8,997,136 B2 | 3/2015 | Brooks et al. |
| 9,564,932 B1 | 2/2017 | Pack et al. |
| 9,612,816 B2 | 4/2017 | Choi et al. |
| 9,654,149 B2 | 5/2017 | Piipponen et al. |
| 10,243,773 B1 * | 3/2019 | Shattil ................. H04L 27/2634 |
| 2001/0049691 A1 | 12/2001 | Asazu |
| 2002/0032754 A1 | 3/2002 | Logston et al. |
| 2002/0038358 A1 | 3/2002 | Sweatt, III et al. |
| 2002/0044569 A1 | 4/2002 | Kwok et al. |
| 2002/0078161 A1 | 6/2002 | Cheng |
| 2002/0080038 A1 | 6/2002 | Smith |
| 2002/0085619 A1 * | 7/2002 | Cho ........................ H04B 1/76 375/130 |
| 2002/0122040 A1 | 9/2002 | Noyle |
| 2002/0122656 A1 | 9/2002 | Gates et al. |
| 2002/0174433 A1 | 11/2002 | Baumgartner et al. |
| 2003/0009567 A1 | 1/2003 | Farouk |
| 2003/0009769 A1 | 1/2003 | Hensgen et al. |
| 2003/0110331 A1 | 6/2003 | Kawano et al. |
| 2003/0121054 A1 | 6/2003 | Lorenz |
| 2003/0158906 A1 | 8/2003 | Hayes |
| 2003/0204848 A1 | 10/2003 | Cheng et al. |
| 2003/0229899 A1 | 12/2003 | Thompson et al. |
| 2003/0231855 A1 | 12/2003 | Gates et al. |
| 2004/0003400 A1 | 1/2004 | Carney et al. |
| 2004/0034697 A1 | 2/2004 | Fairhurst et al. |
| 2004/0040041 A1 | 2/2004 | Crawford |
| 2004/0073944 A1 | 4/2004 | Booth |
| 2004/0078829 A1 | 4/2004 | Patel et al. |
| 2004/0103434 A1 | 5/2004 | Ellis |
| 2004/0107451 A1 | 6/2004 | Khandelwal et al. |
| 2004/0143836 A1 | 7/2004 | McCormack et al. |
| 2004/0181800 A1 | 9/2004 | Rakib et al. |
| 2004/0181811 A1 | 9/2004 | Rakib |
| 2004/0187152 A1 | 9/2004 | Francis et al. |
| 2004/0230754 A1 | 11/2004 | Gumm et al. |
| 2004/0261114 A1 | 12/2004 | Addington et al. |
| 2004/0267965 A1 | 12/2004 | Vasudevan et al. |
| 2005/0027715 A1 | 2/2005 | Casey et al. |
| 2005/0050160 A1 | 3/2005 | Upendran et al. |
| 2005/0162267 A1 | 7/2005 | Khandelwal et al. |
| 2005/0289618 A1 | 12/2005 | Hardin |
| 2006/0055527 A1 | 3/2006 | Pugel |
| 2006/0084417 A1 | 4/2006 | Melpignano et al. |
| 2006/0161946 A1 | 7/2006 | Shin |
| 2006/0168159 A1 | 7/2006 | Weisman et al. |
| 2006/0184661 A1 | 8/2006 | Weisman et al. |
| 2006/0262770 A1 | 11/2006 | Park et al. |
| 2006/0270347 A1 * | 11/2006 | Ibrahim ............... H04M 1/6091 455/41.2 |
| 2007/0004377 A1 | 1/2007 | Medford et al. |
| 2007/0022459 A1 | 1/2007 | Gaebel, Jr. et al. |
| 2007/0156539 A1 | 7/2007 | Yates |
| 2007/0207771 A1 | 9/2007 | Bowser et al. |
| 2007/0237159 A1 | 10/2007 | Yamada et al. |
| 2008/0010506 A1 | 1/2008 | Tabei et al. |
| 2008/0126540 A1 | 5/2008 | Zeng et al. |
| 2008/0313345 A1 | 12/2008 | Bernardin et al. |
| 2009/0064311 A1 | 3/2009 | Clark et al. |
| 2009/0113525 A1 * | 4/2009 | Rajan .................. H04W 12/082 726/4 |
| 2009/0307307 A1 | 12/2009 | Igarashi |
| 2009/0323516 A1 | 12/2009 | Bhagwan et al. |
| 2010/0035610 A1 | 2/2010 | Narang et al. |
| 2010/0070630 A1 | 3/2010 | Ding |
| 2010/0165947 A1 | 7/2010 | Taniuchi et al. |
| 2010/0211793 A1 | 8/2010 | Park et al. |
| 2010/0219976 A1 | 9/2010 | Park et al. |
| 2010/0248627 A1 * | 9/2010 | S ............................ H04W 8/18 455/41.2 |
| 2010/0262722 A1 | 10/2010 | Vauthier et al. |
| 2011/0124335 A1 | 5/2011 | Martin et al. |
| 2011/0130112 A1 | 6/2011 | Saigh et al. |
| 2011/0191321 A1 | 8/2011 | Gade et al. |
| 2011/0270751 A1 | 11/2011 | Csinger et al. |
| 2011/0314462 A1 | 12/2011 | Clark et al. |
| 2012/0122428 A1 | 5/2012 | Stephens, Jr. |
| 2012/0191771 A1 * | 7/2012 | Preston ................ G08B 25/006 709/201 |
| 2012/0210379 A1 | 8/2012 | McCoy et al. |
| 2012/0287452 A1 | 11/2012 | Tsujimoto |
| 2012/0331096 A1 | 12/2012 | Yamaguchi et al. |
| 2013/0007413 A1 | 1/2013 | Thomson et al. |
| 2013/0010686 A1 | 1/2013 | Shatzkamer et al. |
| 2013/0077554 A1 | 3/2013 | Gauvreau et al. |
| 2013/0109323 A1 | 5/2013 | Ruutu et al. |
| 2013/0136089 A1 | 5/2013 | Gillett et al. |
| 2013/0174223 A1 | 7/2013 | Dykeman et al. |
| 2013/0201316 A1 | 8/2013 | Binder et al. |
| 2013/0219010 A1 | 8/2013 | Mahendran et al. |
| 2013/0238426 A1 | 9/2013 | Mukhopadhyay et al. |
| 2013/0266179 A1 | 10/2013 | Jin |
| 2013/0298157 A1 | 11/2013 | Amsterdam et al. |
| 2014/0035182 A1 | 2/2014 | Boyer et al. |
| 2014/0269865 A1 | 9/2014 | Aparin |
| 2014/0282704 A1 | 9/2014 | Tumuluru et al. |
| 2014/0282802 A1 | 9/2014 | Bowler et al. |
| 2014/0308986 A1 | 10/2014 | Yang et al. |
| 2014/0354442 A1 | 12/2014 | Maity et al. |
| 2015/0026740 A1 | 1/2015 | Poder et al. |
| 2015/0052512 A1 | 2/2015 | Kostadinov et al. |
| 2015/0055623 A1 | 2/2015 | Li et al. |
| 2015/0058861 A1 | 2/2015 | Zheng et al. |
| 2015/0134970 A1 | 5/2015 | Jang et al. |
| 2015/0156095 A1 | 6/2015 | Lu |
| 2015/0327313 A1 | 11/2015 | Kim et al. |
| 2015/0365833 A1 * | 12/2015 | Stafford ................ H04W 24/02 370/252 |
| 2016/0007138 A1 | 1/2016 | Palanisamy et al. |
| 2016/0013855 A1 | 1/2016 | Campos et al. |
| 2016/0094421 A1 | 3/2016 | Bali et al. |
| 2016/0128072 A1 | 5/2016 | Rajagopal et al. |
| 2016/0259923 A1 | 9/2016 | Papa et al. |
| 2016/0294498 A1 | 10/2016 | Ma et al. |

(56) References Cited

U.S. PATENT DOCUMENTS

| | | |
|---|---|---|
| 2017/0055315 A1* | 2/2017 | Lin .................. H04W 84/12 |
| 2017/0093663 A1* | 3/2017 | Douglas ............ H04L 41/142 |
| 2017/0094527 A1 | 3/2017 | Shattil et al. |
| 2017/0111846 A1 | 4/2017 | Kang |
| 2017/0134906 A1* | 5/2017 | Yoo .................... H04W 8/22 |
| 2017/0149937 A1 | 5/2017 | Ren et al. |
| 2017/0155703 A1 | 6/2017 | Hao et al. |
| 2017/0156076 A1* | 6/2017 | Eom ................... H04W 4/70 |
| 2017/0208540 A1 | 7/2017 | Egner et al. |
| 2017/0257151 A1* | 9/2017 | Lange ................. H04W 4/06 |
| 2017/0316233 A1 | 11/2017 | Kherani et al. |
| 2017/0347224 A1* | 11/2017 | Robba ............. H04L 63/0876 |
| 2018/0146058 A1 | 5/2018 | Somayazulu et al. |
| 2018/0234403 A1 | 8/2018 | Casella et al. |
| 2018/0235007 A1 | 8/2018 | Gou et al. |
| 2018/0255576 A1 | 9/2018 | Bhorkar et al. |
| 2018/0279212 A1 | 9/2018 | Malik et al. |
| 2018/0316563 A1 | 11/2018 | Kumar et al. |
| 2018/0343685 A1 | 11/2018 | Hart et al. |
| 2018/0351665 A1 | 12/2018 | Fukuta et al. |
| 2018/0351809 A1 | 12/2018 | Meredith et al. |
| 2018/0375887 A1 | 12/2018 | Dezent et al. |
| 2019/0037630 A1 | 1/2019 | Zhang et al. |
| 2019/0104551 A1 | 4/2019 | Deenoo et al. |
| 2019/0109643 A1 | 4/2019 | Campos et al. |
| 2019/0124572 A1 | 4/2019 | Park et al. |
| 2019/0124696 A1 | 4/2019 | Islam et al. |
| 2019/0150182 A1 | 5/2019 | Koorapaty et al. |
| 2019/0182895 A1 | 6/2019 | Di Girolamo et al. |
| 2019/0239190 A1 | 8/2019 | Patel et al. |
| 2019/0319814 A1 | 10/2019 | Das |
| 2019/0320494 A1 | 10/2019 | Jayawardene et al. |
| 2019/0320498 A1 | 10/2019 | Sadri et al. |
| 2019/0379455 A1 | 12/2019 | Wang et al. |
| 2020/0214065 A1 | 7/2020 | Tomala et al. |

FOREIGN PATENT DOCUMENTS

| | | |
|---|---|---|
| KR | 20160097917 A | 8/2016 |
| WO | WO-0024192 A1 | 4/2000 |
| WO | WO-2004008693 A1 | 1/2004 |
| WO | WO-2004045125 A2 | 5/2004 |

* cited by examiner

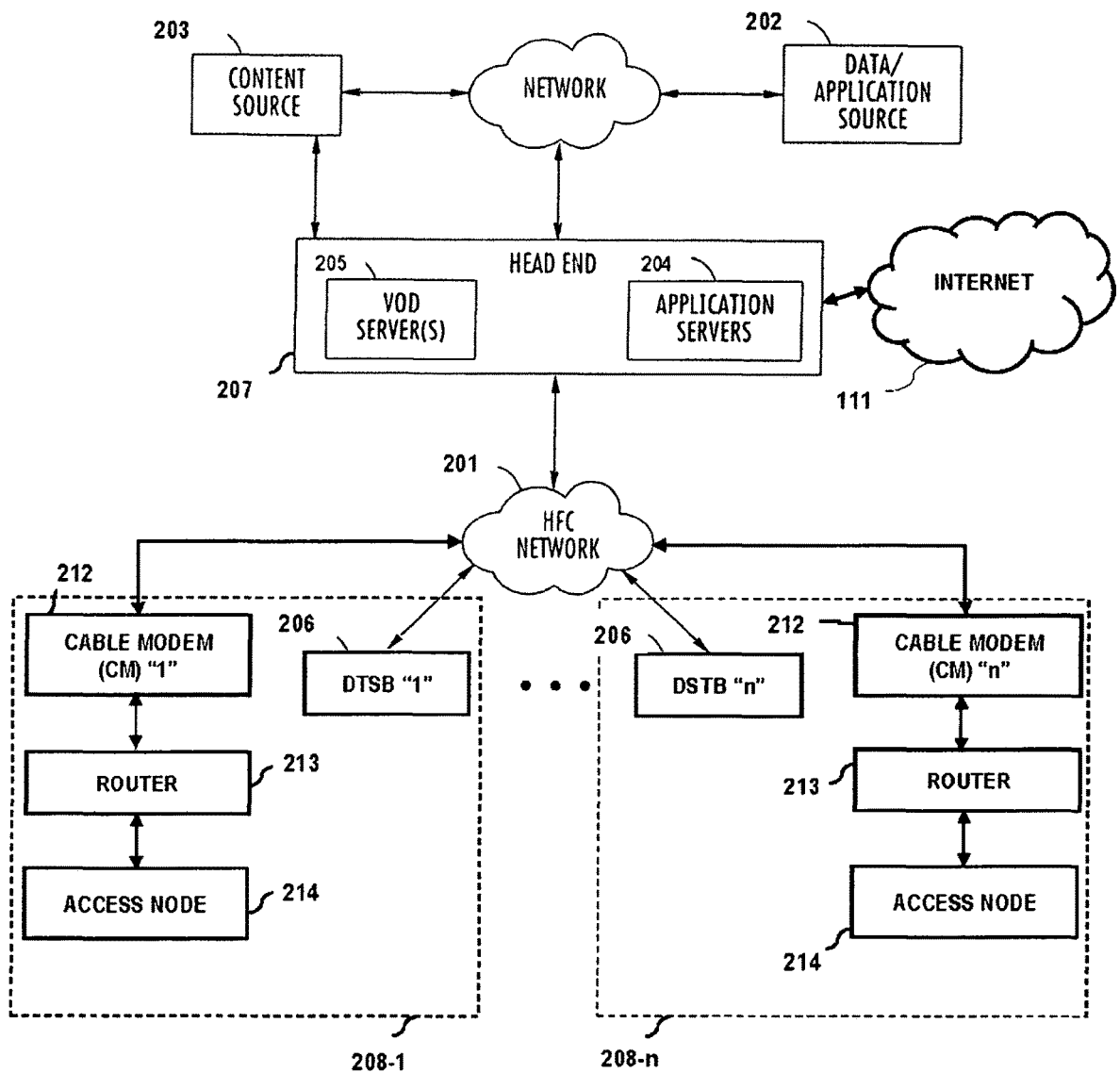

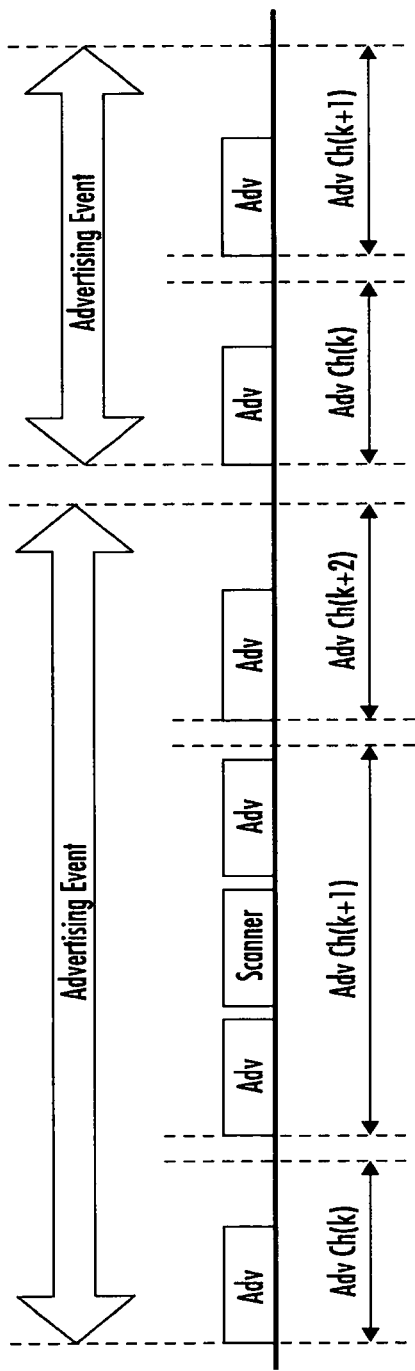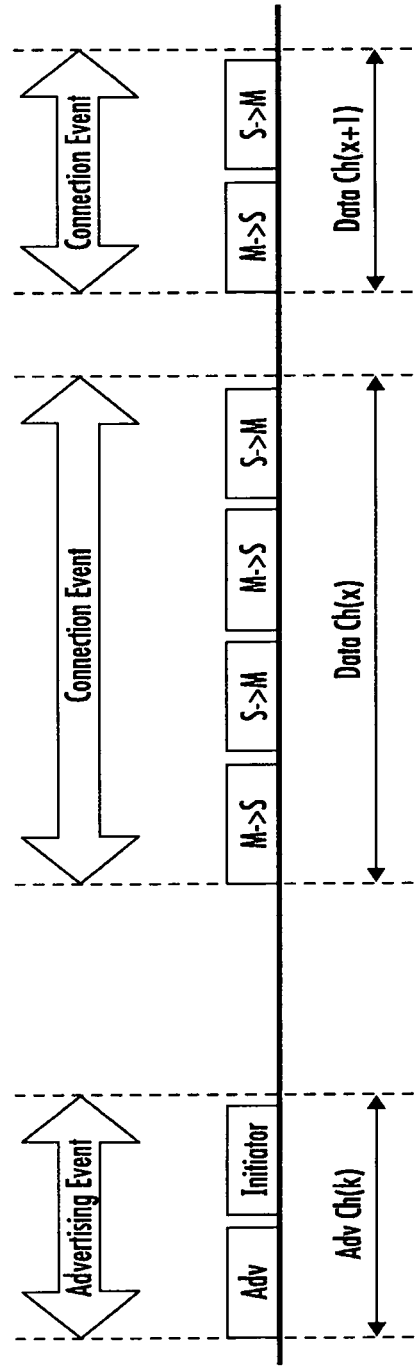
FIG. 7c-1 (Prior art)
FIG. 7c-2 (Prior art)

APPARATUS AND METHODS FOR PREMISES DEVICE EXISTENCE AND CAPABILITY DETERMINATION

PRIORITY

This application is a continuation of and claims priority to co-owned U.S. patent application Ser. No. 15/821,218 filed on Nov. 22, 2017 entitled "APPARATUS AND METHODS FOR PREMISES DEVICE EXISTENCE AND CAPABILITY DETERMINATION," and issuing as U.S. Pat. No. 10,966,073 on Mar. 30, 2021, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of computerized devices and networks thereof, and specifically in one exemplary aspect to the characterization of a premises (such as a home or office) as to indigenous wireless IoT ("Internet of Things") devices and their interconnections.

2. Description of Related Technology

Data communication services are now ubiquitous throughout user premises (e.g., home, office, and even vehicles). Such data communication services may be provided via a managed or unmanaged network. For instance, a typical home has services provided by one or more network service providers via a managed network such as a cable or satellite network. These services may include content delivery (e.g., linear television, on-demand content, personal or cloud DVR, "start over", etc.), as well as so-called "over the top" third party content. Similarly, Internet and telephony access is also typically provided, and may be bundled with the aforementioned content delivery functions into subscription packages, which are increasingly becoming more user- or premises-specific in their construction and content. Such services are also increasingly adopting the paradigm of "anywhere", anytime," so that users (subscribers) can access the desired services (e.g., watch a movie) via a number of different receiving and rendering platforms, such as in different rooms of their house, on their mobile device while traveling, etc.

Cloud-Based Functions

In order to support the foregoing operational flexibility (and to gain operational and economic efficiencies), technology stacks have over time generally migrated towards the "cloud" or network side of the foregoing managed service provider networks (e.g., into regionalized data centers), and away from the end user (client) consuming devices. Hence, the client device's content selection, description and presentation capabilities are dictated increasingly by these cloud-based functions (including network-side guide data generation architectures), along with the on-board storage and processing power of the client device and its associated software stack. This "cloud control" provides the network operators (and third parties such as advertisers) significant opportunities in terms of user/premises customization and personalization, whether relating to content delivery, advertising, or yet other functions. Data regarding user/premises activities (e.g., channel changes, programming selections, behavior during advertisements, purchase made by the user, etc.) can be sent up to the cloud for analysis and storage, including generation of user-specific, premises-specific, and/or device-specific profiles that can be used for later configuring services provided to that particular user/premises/device.

For example, cloud-based EPGs (electronic program guides) are increasingly configured to provide a customizable and user-specific experience (e.g., populating the guide with content targeted for the user/premises, and ancillary information such as data from their parties), as well as the additional aspects of reduced device processing and storage footprint, and a consistent and simple mechanism for software upgrades across multiple different types of HW/SW platforms (e.g., different OEM devices). For instance, HTML 5-based cloud apps are increasingly replacing native apps (i.e., those incorporated into the design of the device at time of manufacture) for implementing such functions. Exemplary implementations such as the cloud-based Spectrum Guide offered by the Assignee hereof integrates data from multiple sources in forming an aggregated user interface with which the user interacts via their premises client device (e.g., Smart TV, DSTB, or mobile device).

Specifically, in the foregoing example of the Spectrum Guide cloud-delivered EPG, all objects (from content poster art to the elements of the day/time grid, and most visual video content) is stitched and delivered as a single stream to the client device, as opposed to being indigenously generated by the client. The program guide elements (e.g., graphics) are stitched together as a transport stream, while video content that is utilized within a window or other display element of this program guide on the user device comes from a different source, and any advertisements come from yet a third location, akin to the operation of a web browser.

Such cloud-based functionality also provides enhanced opportunity for data "fusion" for the user. As previously noted, data from various heterogeneous sources can be accessed via the cloud architecture, and transmitted to the user's client device via e.g., the aforementioned transport stream. For example, data associated with tailored or personalized news feeds, user-specific email or text message alerts, VoIP call status, etc. can be obtained and provided to the user via the cloud-based UI (e.g., EPG).

Also useful to the user is data relating to the user's premises equipment and configuration. For example, computerized devices within the user's premises other than those provided by, or associated with the services of the MSO or service provider, may exist, including for instance personal electronics, appliances, security systems, and home automation systems. One emerging class of such non-service provider devices are so called "IoT" or "Internet of Things" devices, aimed at providing enhanced data communication functionality between the IoT devices and third parties (e.g., a service provider), and between the IoT devices themselves.

IoT Devices

IoT devices can use any number of lower- and higher-layer protocol stacks. Many are based on the IEEE Std. 802.15.4 WPAN MAC/PHY (including Zigbee and Thread), while others utilize BLE (Bluetooth Low Energy, also referred to colloquially as Bluetooth Smart). These technologies utilize unlicensed portions of the radio frequency spectrum (e.g., ISM bands in the U.S.) for communication, and may attempt to avoid interference or conflict with other ISM-band technologies such as Wi-Fi (IEEE Std. 802.11). FIG. 1a is a graphical representation of radio frequency bands associated with such IEEE Std. 802.15.4 and Bluetooth Low Energy (BLE) wireless interfaces.

Currently, the following non-exhaustive list of exemplary technologies are available or under development for IoT applications:

Zigbee—ZigBee 3.0 is based on IEEE Std. 802.15.4, and operates at a nominal frequency of 2.4 GHz as well as 868 and 915 MHz (ISM), supports data rates on the order of 250 kbps, and has a range on the order of 10-100 meters. Zigbee radios use direct-sequence spread spectrum (DSSS) spectral access/coding, and binary phase-shift keying (BPSK) is used in the 868 and 915 MHz bands, and offset quadrature phase-shift keying (OQPSK) that transmits two bits per symbol is used for the 2.4 GHz band.

Z-Wave—Z-Wave technology is specified by the Z-Wave Alliance Standard ZAD12837 and ITU-T G.9959 (for PHY and MAC layers). It operates in the U.S. at a nominal frequency of 900 MHz (ISM), as shown in Table 1 below:

TABLE 1

| Region | Center frequency | | Data rate | Channel Width |
|---|---|---|---|---|
| | G.9959 | MHz | G.9959 | kHz |
| United States of America | $f_{US1}$ | 916.00 | R3 | 400 |
| | $f_{US2}$ | 908.40 | R2 | 300 |
| | | | R1 | 300 |

R1 - Type 1 of supported data rate - 9.6 kbps
R2 - Type 2 of supported data rate - 40 kbps
R3 - Type 3 of supported data rate - 100 kbps Z-Wave has a range on the order of 30 meters, and supports full mesh networks without the need for a coordinator node (as in 802.15.4). It is scalable, enabling control of up to 232 devices. Z-Wave uses a simpler protocol than some others, which can ostensibly enable faster and simpler development. Z-Wave also supports AES128 encryption and IPv6.

6LowPAN-6LowPAN (IPv6 Low-power wireless Personal Area Network) is an IP-based network protocol technology (rather than an IoT application protocol technology such as Bluetooth or ZigBee), as set forth in RFC 6282. 6LowPAN defines encapsulation and header compression mechanisms, and is not tied to any particular PHY configuration. It can also be used along with multiple communications platforms, including Ethernet, Wi-Fi, 802.15.4 and sub-1 GHz ISM. The IPv6 (Internet Protocol version 6) stack enables embedded objects or devices to have their own unique IP address, and connect to the Internet. IPv6 provides a basic transport mechanism to e.g., enable complex control systems, and to communicate with devices via a low-power wireless network.

For instance, 6LowPAN can send IPv6 packets over an IEEE802.15.4-based network which implements "open" IP standards such TCP, UDP, HTTP, COAP, MQTT, and websockets to enable end-to-end addressable nodes, allowing a router to connect the network to IP. Moreover, mesh router devices can route data destined for other devices, while hosts are able to sleep (and hence conserve power).

Thread—Thread is a royalty-free protocol based on various standards including IEEE Std. 802.15.4 (as the air-interface protocol) and 6LoWPAN. It is intended to offer an IP-based solution for IoT applications, and is designed to interoperate with existing IEEE Std. 802.15.4-compliant wireless silicon. Thread supports mesh networking using IEEE Std. 802.15.4 radio transceivers, and can handle numerous nodes, including use of authentication and encryption.

Bluetooth Smart/BLE—Bluetooth Smart or BLE is intended to provide considerably reduced power consumption and cost while maintaining a similar communication range to that of conventional Bluetooth radios. Devices that employ Bluetooth Smart features incorporate the Bluetooth Core Specification Version 4.0 (or higher—e.g., Version 4.2 announced in late 2014) with a combined basic-data-rate and low-energy core configuration for a RF transceiver, baseband and protocol stack. Version 4.2, via its Internet Protocol Support Profile, allows Bluetooth Smart sensors to access the Internet directly via 6LoWPAN connectivity (discussed supra). This IP connectivity enables use of existing IP infrastructure to manage Bluetooth Smart "edge" devices. In 2017, the Bluetooth SIG released Mesh Profile and Mesh Model specifications, which enable using Smart for many-to-many device communications. Moreover, many mobile operating systems including iOS, Android, Windows Phone, BlackBerry, and Linux, natively support Bluetooth Smart.

The Bluetooth 4.2 Core Specification specifies a frequency of 2.4 GHz (ISM band), supports data rates on the order of 1 Mbps, utilizes GFSK (Gaussian Frequency Shift Keying) modulation, and has a typical range on the order of 50 to 150 meters. BLE uses frequency hopping (FHSS) over 37 channels (0-36 in FIG. 1a) for (bidirectional) communication, and over 3 channels for (unidirectional) advertising. The Bluetooth 4.0 link-layer MTU is 27 bytes, while 4.2 used 251 bytes. Core specification 5.0 (adopted Dec. 6, 2016) yet further extends and improves upon features of the v4.2 specification.

A BLE device can operate in four (4) different device roles, each which may cause the devices to behave differently. Two of the roles are connection-based; i.e., a peripheral device is an advertiser that is connectable and can operate as a slave as part of a two-way (bidirectional) data connection, and a central device that monitors for advertisers, and can initiate connections operating as a master for those connections. Conversely, the other two device roles are used for unidirectional communications; i.e., a broadcaster (a non-connectable advertiser which, for example, merely broadcasts data from a sensor of the IoT device, or an observer that monitors for advertisements, but cannot initiate connections (e.g., the receiver for the above-referenced broadcaster). Peripheral devices that implement a GATT Server (storage/exchange architecture) can be branded as a "Bluetooth Smart" device.

Extant technologies adapted for intermediate range WAN (e.g., somewhere between cellular and WLAN) IoT functionality applications include Sigfox, Neul, and LoRaWAN. These are typically employed for much longer distances than the comparatively short-range PAN solutions described above.

Generally speaking, there are two (2) classes or types of IoT installations within a premises: (i) "transparent" installations, wherein the installed IoT end-devices are visible to network devices, whether within or external to the premises; and (ii) "proxy managed" installations, wherein the installed IoT end-devices are managed by a proxy device such as a hub or gateway, and may be invisible to network devices outside the proxy device. Some premises may also freely intermix these two types of installations, such as where some IoT devices are behind a proxy and utilize a proprietary protocol of a common manufacturer, while others are added "ad hoc" without regard to the proxy or proprietary protocol (and which do not inter-communicate therewith), as now described with respect to FIG. 1.

Referring to FIG. 1, in the first type of installation ("transparent"), individual IoT end-devices 102 within a premises 100 may be networked according to various types of topologies (e.g., master-slave, peer-to-peer (P2P), coordinator-simple node, star, cluster, mesh, tree, or other), and may maintain their own status on the network via e.g., assignment of an externally accessible IP address. This makes such devices 102 externally accessible and addressable for, inter alia, remote network entities 106 via any interposed networks such as the Internet 101 and the service provider distribution network 101. For instance, a web server 106 operated by a manufacturer of an IoT-enabled refrigerator may be able to, assuming suitable permissions, communicate directly with the IoT device over the Internet 111 and interposed ISP modem 105 (e.g., DOCSIS cable modem, DSP modem, etc.), a router 107, and local wireless access node 109 (e.g., an IEEE Std. 802.15.4 coordinator or Bluetooth LE master) via its assigned IP address (e.g., an IPv4 or IPv6 address), such as to obtain data logged by the IoT refrigerator (e.g., internal/external temperature profile over time, door openings as a function of time, loss-of-power events, etc.), and/or "push" firmware or other updates to the device such as to implement new or enhanced functions. The assigned IP address may be globally unique (i.e., such that it is unique across the Internet 111 external to the premises), or alternatively locally unique (e.g., unique within its local topology, but not necessarily globally unique). The latter can be translated (via e.g., NAT or network address translation functions) into the former such as by a router 110 or other premises "edge" device configured to perform NAT.

In the second type of installation ("proxy managed"), a hub 112 or other intermediary device is interposed between the IoT end-device(s) 104 and the service provider distribution network 101 external to the premises (including the modem 105 and router 107). The hub 112 may include, as shown, its own internal wireless access interface, whereby the "managed" IoT devices 104 communicate with the hub 112 wirelessly so as to communicate data. The protocols used between the hub 112 and the managed IoT devices 104 may be proprietary (e.g., at the higher layers of the protocol stack, or even including proprietary PHY and lower layer protocols), and may even employ security measures such as encryption of data, password protection, etc. so as to maintain the managed IoT devices 104 and the hub itself less susceptible to surreptitious communications, MITM attacks, etc.

The web server 106 may communicate with the IoT proxy (hub) 112, such as to "pull" data from, or "push" data to, the IoT end-devices 104. For instance, in one model, the hub periodically polls or receives data from the IoT devices 104, and then reports this aggregated data to the web server 106 via a push/pull mechanism. For instance, the hub 112 may have an outward-facing API (application programming interface) whereby the web server 106 or other process can implement the API function (e.g., a data "GET"). However, such API functionality (and hub access in general) is typically highly restricted, primarily for security and privacy reasons. Given that the hub 112 can "talk" to the managed IoT devices 104, surreptitious access to the hub (and hence IoT devices 104) could result in a host of undesirable consequences, including third parties reprogramming the IoT device 104, obtaining private use or other data from the devices 104 (e.g., how many times a user uses their refrigerator), accessing indigenous features of the device 104 (e.g., turning on the camera function of a user's smart TV so as to be able to see inside the user's premises), corrupting or accessing a user's private data (including changing passwords for devices, so as to lock out the user akin to ransomware), and so forth.

Notwithstanding, one of the most powerful aspects of the "Internet of Things" from an architectural perspective is in fact ubiquitous connectivity; the ability for example of the aforementioned refrigerator to interface with local or remote entities to enhance its performance, save the owner money on electric bills, diagnose/troubleshoot itself, and any other of numerous possible use cases, all militate in favor of high levels of connectivity. Such is also true of adapting products and/or services to particular user traits or habits; for instance, targeted service or advertising provision can be effectively based on user-specific habits or traits (e.g., a person who frequently uses their microwave oven may lean toward microwave-able food items, and may benefit from advertising relating thereto).

Hence, there is a tension between providing pervasive connectivity and information-sharing, and the obvious security and privacy concerns as described above.

As with personal computer technology when in its infancy, IoT technology is still rapidly evolving, and mechanisms for standardization, simplicity and ease of operation ("user experience"), and other desirable attributes are not yet perfected or widely adopted. For example, one manufacturer's IoT-enabled device (e.g., refrigerator) might utilize one communication protocol, have its own device-specific or proprietary software stack (including user interface functions and menus), and its own peculiarities regarding operation, as compared to another device (e.g., a "smart" microwave oven) of another manufacturer. Regardless of whether the "transparent" or "proxy managed" architectures referenced above are used for a particular IoT-enabled device, there is also setup and configuration required to enable data communication, including with other devices within the premises.

For instance, a wireless-enabled IoT device might require a complementary wireless access node (akin to a Wi-Fi AP) be installed and connected to the premises network (e.g., as in the exemplary configuration shown in FIG. 1 herein), and may need to be placed at a particular location within the premises such that sufficient connectivity exists. Moreover, the various layers of the IoT device stack may need to be configured, including for instance operational modes, passwords, permissions, and network addresses. Given that most people will typically choose a patchwork of different devices of different manufacturers (e.g., a Samsung refrigerator, an LG Smart TV, a GE microwave, a Panasonic cordless phone, etc.), such devices may require individualized setup and configuration, and moreover may each communicate only according to their own particular protocols (which may even be proprietary). This is particularly true from an "extra-premises" perspective (e.g., from the perspective of a network operator or MSO attempting to communicate with and characterize the premises in terms of computerized/IoT devices and functions); network addresses, protocols, APIs, etc. associated with one device may be wholly inapplicable for other devices in the same or different premises. Some higher-layer protocols such as Zigbee and Thread ostensibly provide interoperability between devices from different manufacturers; however, as of this writing, neither Zigbee nor Thread is ubiquitous in IoT devices (especially within a user premises such as a home), and other competing solutions exist.

The MSO or service provider in the above scenario could feasibly solicit the user's assistance in characterizing the types, placement, and capabilities of the various devices in their own premises; however, most users would rather not be bothered, and moreover may have privacy concerns relating to giving out to much information, even to an ostensibly trustworthy entity such as a managed network operator or MSO.

Accordingly, improved apparatus and methods are needed to address one or more of the foregoing issues relating to the difficulty in characterization of a premises to which services are provided, particularly in the cloud-based paradigms wherein multiple different entities may obtain and analyze data generated from the premises, as well as provide targeted content and data products and services to the premises, and even source content for the user from one or more of the identified IoT-enabled devices.

SUMMARY

The present disclosure addresses the foregoing needs by providing, inter alia, apparatus and methods for characterizing and utilizing the capabilities of premises IoT devices.

In a first aspect of the disclosure, a premises characterization device is disclosed. In one embodiment, the characterization device comprises a computerized device with software-defined wireless interface, and which is optionally capable of data communication with a network process (e.g., controller). The characterization device is placed within the premises (such as via integration with a DSTB, cable modem, or other device also being placed in the premises), and passively characterizes the RF environment of the premises in one or more RF communications bands (e.g., those typically employed by IoT wireless interfaces).

In another aspect, a computerized apparatus configured to obtain data relating to use of one or more air interfaces within a premises is disclosed. In one embodiment, the computerized apparatus includes: processor apparatus; software-defined radio (SDR) apparatus in data communication with the processor apparatus; and storage apparatus in data communication with the processor apparatus and comprising at least one computer program. In one implementation, the at least one computer program comprising a plurality of instructions which are configured to, when executed by the processor apparatus, cause the computerized apparatus to: utilize the SDR apparatus to scan a first radio frequency (RF) band, the first RF band associated with a first short-range communications protocol, the scan configured to detect energy associated with a first RF transmitter; based at least on the detection of energy within the first RF band, cause synchronization with a signal emitted from the first RF transmitter using the first short-range communications protocol; based at least on the synchronization with the signal, cause identification of a first computerized device associated with the first RF transmitter; and cause provision of data relating to the identity of the computerized device to a software process.

In one variant, the first short-range communication protocol comprises an IEEE Std. 802.15.4 protocol, and the synchronization with the signal comprises decode of a broadcast message transmitted from the first RF transmitter.

In another variant, the computerized apparatus comprises a host device having a radio frequency interface configured for data communication with a managed content distribution network, and the SDR apparatus is integrated within the host device. The managed content distribution network comprises for instance a hybrid fiber coax (HFC) cable network, and the host device comprises at least one of: (i) a digital set-top box (DSTB), and/or (ii) a DOCSIS-compliant cable modem.

In another variant, the managed content distribution network comprises a hybrid fiber coax (HFC) cable network, and the host device comprises wireless LAN (WLAN) access point (AP); and the SDR is configured for inter-process communication with a WLAN modem of the WLAN AP, the inter-process communication configured to enable coordination between the SDR and WLAN for avoidance of at least some RF interference between the WLAN modem and the SDR.

In a further variant, the SDR apparatus is configured to transmit a message according to the first short range communication protocol to instigate the first RF transmitter to transmit.

In yet another variant, the SDR apparatus is further configured to scan a second frequency band associated with a second short-range communications protocol, the scan of the second frequency band configured to detect energy associated with a second RF transmitter of a second computerized device. For example, the first short-range communication protocol comprises an IEEE Std. 802.15.4 protocol, and the second short-range communication protocol comprises a BLE (Bluetooth low energy) protocol.

In yet a further variant, the first short-range communication protocol comprises a BLE (Bluetooth low energy) protocol and the SDR apparatus is further configured to, based at least on the detection of energy within the first RF band, cause synchronization with a signal emitted from the first RF transmitter using the first short-range communications protocol, and based at least on a decode of at least a portion of the signal, determine whether the first RF transmitter is acting as a Bluetooth master or Bluetooth slave. For instance, in one implementation, the determination whether the first RF transmitter is acting as a Bluetooth master or Bluetooth slave comprises: transmitting data relating to the decode of the signal to a network entity for processing; and thereafter, receiving data from the network entity indicating at least a portion of a premises topology.

In another aspect of the disclosure, a network apparatus is disclosed. In one embodiment, the network apparatus includes: a first interface configured to communicate with a network; a processor apparatus; and a storage apparatus in data communication with the first interface and the processor apparatus and comprising at least one computer program, the at least one computer program comprising a plurality of instructions which are configured to, when executed by the processor apparatus, cause the network apparatus to: receive via the first interface data generated by a software-defined radio (SDR) apparatus associated with a premises, the data relating to one or more signals transmitted by a computerized device of the premises; evaluate the received data to determine a communications protocol associated with the received data; evaluate the received data to determine a node role for the computerized device.

In one variant, the network apparatus further determines at least a portion of a topology of a premises network within which the computerized device is disposed.

In another variant, the plurality of instructions are further configured to, when executed by the processor apparatus, cause the network apparatus to transmit data relating to the determined at least portion of the topology to a network guide function, the network guide function configured to cause display of data relating to the determined at least portion of the topology on a rendering device of the premises.

In yet a further variant, the plurality of instructions are further configured to, when executed by the processor apparatus, cause the network apparatus to access a database of IoT devices utilizing at least one of the determined communications protocol and the determined role. The database of IoT devices utilizing at least one of the determined communications protocol and the determined role includes for example a database of device class types.

In another variant, the plurality of instructions are further configured to, when executed by the processor apparatus, cause the network apparatus to access a database of IoT devices utilizing at least a MAC (media access control) address for the computerized device, the MAC address obtained from the received data.

In a further aspect, a method of passively characterizing the IoT device profile of a premises is disclosed. In one embodiment, the method includes: disposing a radio frequency (RF) apparatus within the premises, the radio frequency apparatus in data communication with a service provider device; using the RF apparatus to detect energy in one or more prescribed RF bands associated with IoT devices; based at least on the detected energy, receiving and decoding one or transmissions issued by an IoT device within the premises; based at least on the received decoded one or more transmissions, identifying at least one of: (i) the IoT device, and/or (ii) a class of the IoT device; and transmitting data relating to at least one of the identified (i) IoT device, and/or (ii) class of the IoT device, to a network device to enable presentation thereof on a user interface (UI) generated by the service provider device.

In one variant, the identifying at least one of: (i) the IoT device, and/or (ii) a class of the IoT device, comprises identifying a role of the IoT device within a personal area network of the premises.

In another variant, the one or more prescribed bands comprise one or more bands associated with IEEE Std. 802.15.4; and the identifying a role of the IoT device within a personal area network of the premises comprises identifying the IoT device as either a PAN coordinator or coordinator.

In yet another variant, the one or more prescribed bands comprise one or more bands associated with IEEE Std. 802.15.4; and the identifying a role of the IoT device within a personal area network of the premises comprises identifying the IoT device as an RFD-TX (reduced function device-transmit only) device.

In another aspect of the disclosure, a method of tailoring services provided to a premises is disclosed. In one embodiment, the method includes characterizing the premises as to its IoT profile, and based on the characterizing, selectively causing content delivery services to be adjusted to optimize usage in conjunction with the IoT devices of the profile.

In another aspect of the disclosure, a network profile entity is disclosed. In one embodiment the network profile entity comprises a software process operative to run on one or more computerized apparatus of a managed network infrastructure. In one variant, the software process comprises logic configured to obtain premises IoT-related data, and generate a profile of the premises in terms of one or more of: (i) IoT device types, (ii) IoT device functionalities and HW/SW configuration; (iii) IoT device placement; (iv) IoT device network accessibility; (v) IoT device unique identifier; and (vi) IoT device use profile.

In another aspect, a network-assisted premises IoT characterization function is disclosed.

In a further aspect, a non-transitory computer readable apparatus is disclosed. In one embodiment, the apparatus includes a storage medium having one or more computer programs disposed thereon. The one or more programs are configured to, when executed on a processing device of a client device, implement IoT RF sub-band scanning and data recording.

In another aspect, a network architecture is disclosed. In one embodiment, the architecture includes a client process (e.g., app or middleware operative to run on a client device), and IoT configuration manager (ICM) entity configured to communicate with the client process to coordinate RF spectrum scans, data reporting, data utilization, and client rendering of IoT related data, such as on a cloud-based EPG.

These and other aspects shall become apparent when considered in light of the disclosure provided herein.

BRIEF DESCRIPTION OF THE DRAWINGS

FIG. 6a-1 is a functional block diagram of a first exemplary embodiment of a sniffer apparatus used in the CIM-enabled client device apparatus of FIG. 6a.

FIG. 6b-1 is a functional block diagram of a first exemplary embodiment of a sniffer apparatus used in the CIM-enabled client device apparatus of FIG. 6b.

FIG. 6b-2 is a graphical representation of frequency bands associated with prior art IEEE Std. 802.15.4 and Wi-Fi wireless interfaces.

FIGS. 7c-1 and 7c-2 are graphical representations of prior art BLE advertising and connection event timing, respectively.

FIG. 7c-3 is a graphical representation of a prior art BLE data packet format.

FIG. 7c-4 is graphical representations of a prior art BLE data packet payload format.

DETAILED DESCRIPTION

Figure 1:
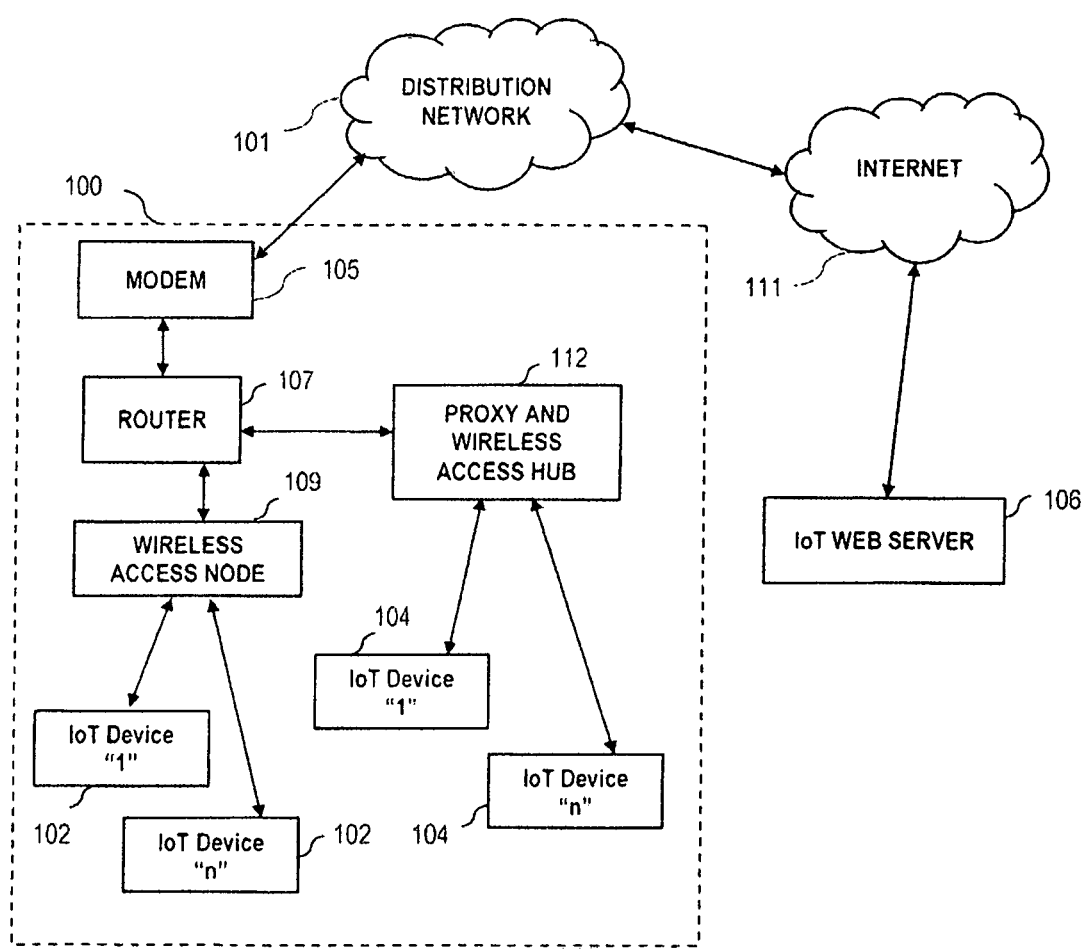
FIG. 1 is a functional block diagram illustrating typical prior art premises IoT configurations.

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator, etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", smartphones, smart TVs, USB-based devices, and vehicle infotainment or navigation systems.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence of human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0, and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "IoT device" refers without limitation to electronic devices having one or more primary functions and being configured to provide and/or receive data via one or more communication protocols. Examples of IoT devices include security or monitoring systems, appliances, consumer electronics, vehicles, infrastructure (e.g., traffic signaling systems), and medical devices, as well as receivers, hubs, proxy devices, or gateways used in association therewith.

As used herein, the term "IoT network" refers without limitation to any logical, physical, or topological connection or aggregation of two or more IoT devices (or one IoT device and one or more non-IoT devices). Examples of IoT networks include networks of one or more IoT devices arranged in a peer-to-peer (P2P), star, ring, tree, mesh, master-slave, and coordinator-device topology.

As used herein, the term "memory" includes any type of integrated circuit or other storage device adapted for storing digital data including, without limitation, ROM, PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), USB (e.g., USB2), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11, Wi-Fi Direct, etc.), LTE/LTE-A, WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information, whether local, virtual, or cloud-based.

As used herein, the term "Wi-Fi" refers to, without limitation and as applicable, any of the variants of IEEE Std. 802.11 or related standards including 802.11 a/b/g/n/s/v/ac/ax or 802.11-2012/2013, as well as Wi-Fi Direct (including inter alia, the "Wi-Fi Peer-to-Peer (P2P) Specification", incorporated herein by reference in its entirety).

As used herein, the term "wireless" means any wireless signal, data, communication, or other interface including without limitation Wi-Fi, Bluetooth/BLE/Bluetooth Mesh Networking, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), CBRS (3.5 GHz), 802.20, Zigbee®, Z-wave, NFC (near field communication), RFID, narrowband/FDMA, OFDM, PCS/DCS, LTE/LTE-A/LTE-U/LTE-LAA, analog cellular, CDPD, satellite systems, millimeter wave or microwave systems, acoustic, Li-Fi, and infrared (i.e., IrDA).

Overview

In one exemplary aspect, the present disclosure leverages the ability to "passively" canvass or assess a given premises as to its IoT profile, including both transparent and proxy-managed installations. Data obtained via this canvassing can be utilized by e.g., a network operator or service provider for any number of different functions, including, for example: (i) populating on-screen displays such as cloud-based EPGs or device setup UIs with data relating to all such IoT devices within the premises; and (ii) one-stop management of various aspects of the IoT devices (e.g., naming, interconnectivity functions, reporting, etc.).

In one embodiment, the passive canvassing of the premises is conducted by a software-defined radio (SDR) device incorporated into another MSO (host) device at the premises (e.g., DOCSIS modem, DSTB, wireless AP/router, or gateway). The SDR is controlled by logic operative to run on the host device, enabling the SDR to scan the RF environment within the premises in particular frequency bands typically associated with IoT devices and protocols. In one variant, the SDR and logic are configured to acquire and decode one or more broadcast channels of the IoT device(s) to obtain yet additional information regarding the particular device.

In another embodiment, the SDR and logic act as an emulator for the given IoT standards, enabling the device to establish data communication with the IoT device(s) to exchange data, and/or instigate a response from a weak transmitter that is out of range, or is not currently operating.

In a further embodiment, the operational characteristics of the IoT device (e.g., broadcast interval if any, sleep interval, estimated radiated power level, etc.) can be characterized by the SDR and associated logic.

DETAILED DESCRIPTION OF EXEMPLARY EMBODIMENTS

Exemplary embodiments of the apparatus and methods of the present disclosure are now described in detail. While these exemplary embodiments are described in the context of a managed network (e.g., hybrid fiber coax (HFC) cable) architecture having a multiple systems operator (MSO), digital networking capability, IP delivery capability, and a plurality of client devices, the general principles and advantages of the disclosure may be extended to other types of networks and architectures that are configured to deliver services such as digital media data (e.g., text, video, and/or audio), whether managed or unmanaged. Such other networks or architectures may be broadband, narrowband, wired or wireless, or otherwise.

It will also be appreciated that while described generally in the context of a network providing service to a customer or consumer (e.g., residential) end user domain, the present disclosure may be readily adapted to other types of environments including, e.g., commercial/enterprise and government/military applications. Myriad other applications are possible.

It is further noted that while exemplary embodiments are described primarily in the context of a cable system with 6 MHz RF channels, the present disclosure is applicable to literally any network topology or paradigm, and any frequency/bandwidth or transport modality.

Similarly, while described primarily in terms of IEEE Std. 802.15.4 (and related) and BLE/Blutooth Smart technologies used for communication to/from IoT devices in the 2.4 GHz ISM band, the various aspects of the disclosure may be applied to other frequency bands (e.g., 5 or 5.8 GHz) and/or types of air interfaces and protocols, whether RF-based or otherwise.

Also, while certain aspects are described primarily in the context of the well-known Internet Protocol (described in, inter alia, RFC 791 and 2460), it will be appreciated that the present disclosure may utilize other types of protocols (and in fact bearer networks to include other internets and intranets) to implement the described functionality.

Other features and advantages of the present disclosure will immediately be recognized by persons of ordinary skill in the art with reference to the attached drawings and detailed description of exemplary embodiments as given below.

Service Provider Network—

Figure 6A:
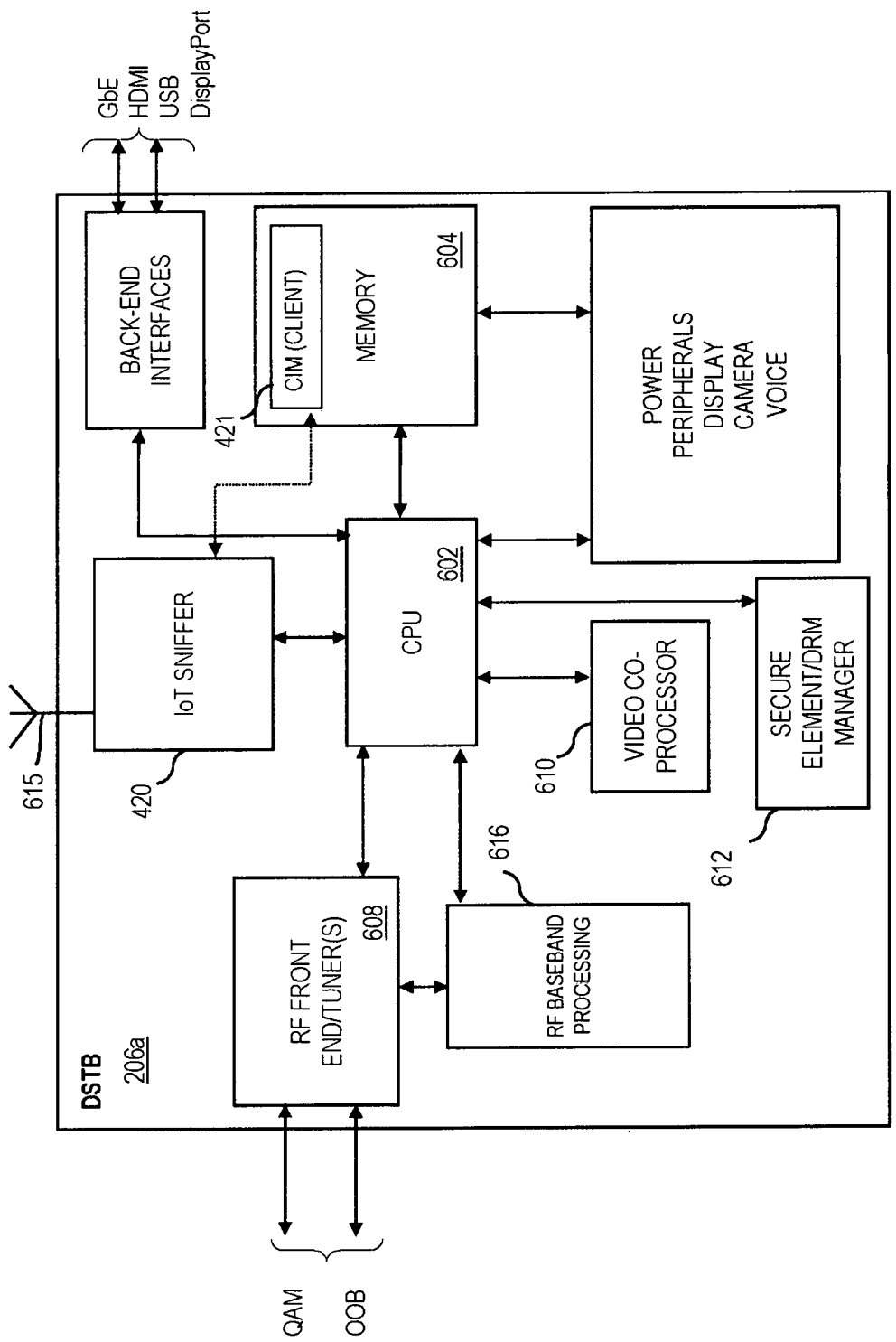
FIG. 6a is a functional block diagram of a first exemplary embodiment of a CIM-enabled client device apparatus (DSTB or DOCSIS modem) according to the present disclosure.
Figures 1, 6A:
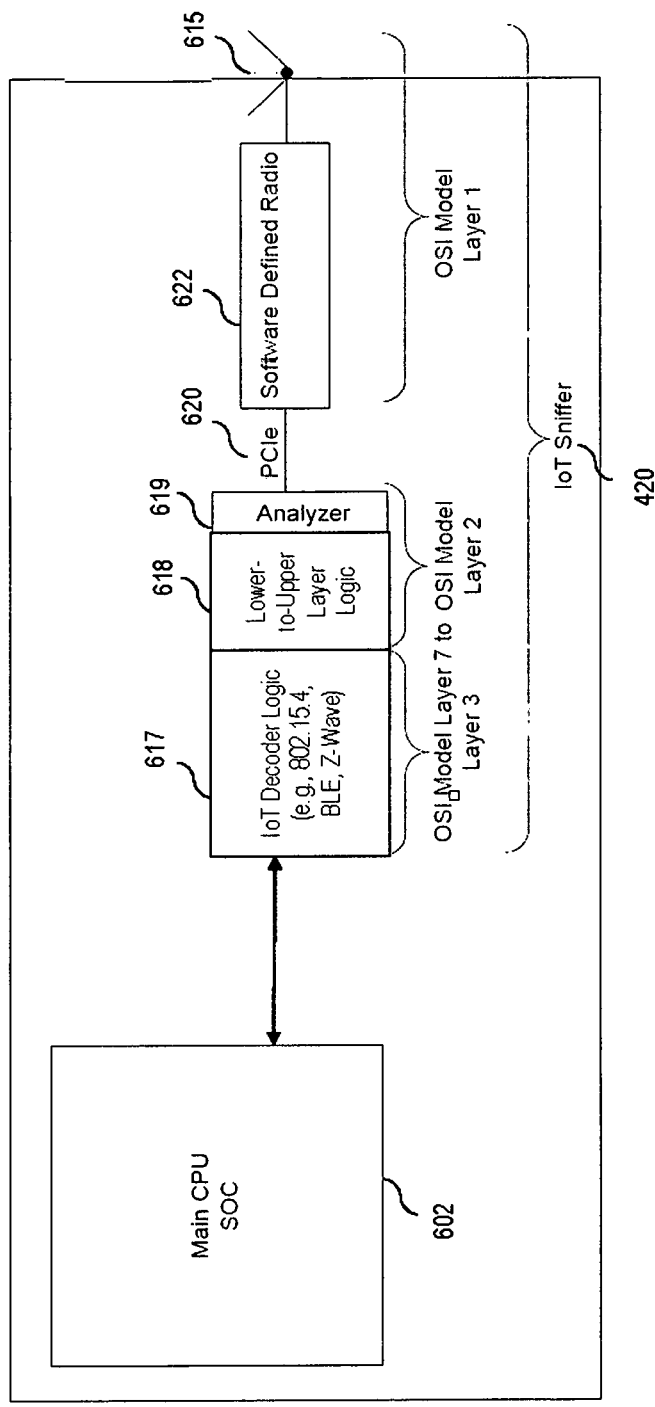
Figure 6B:
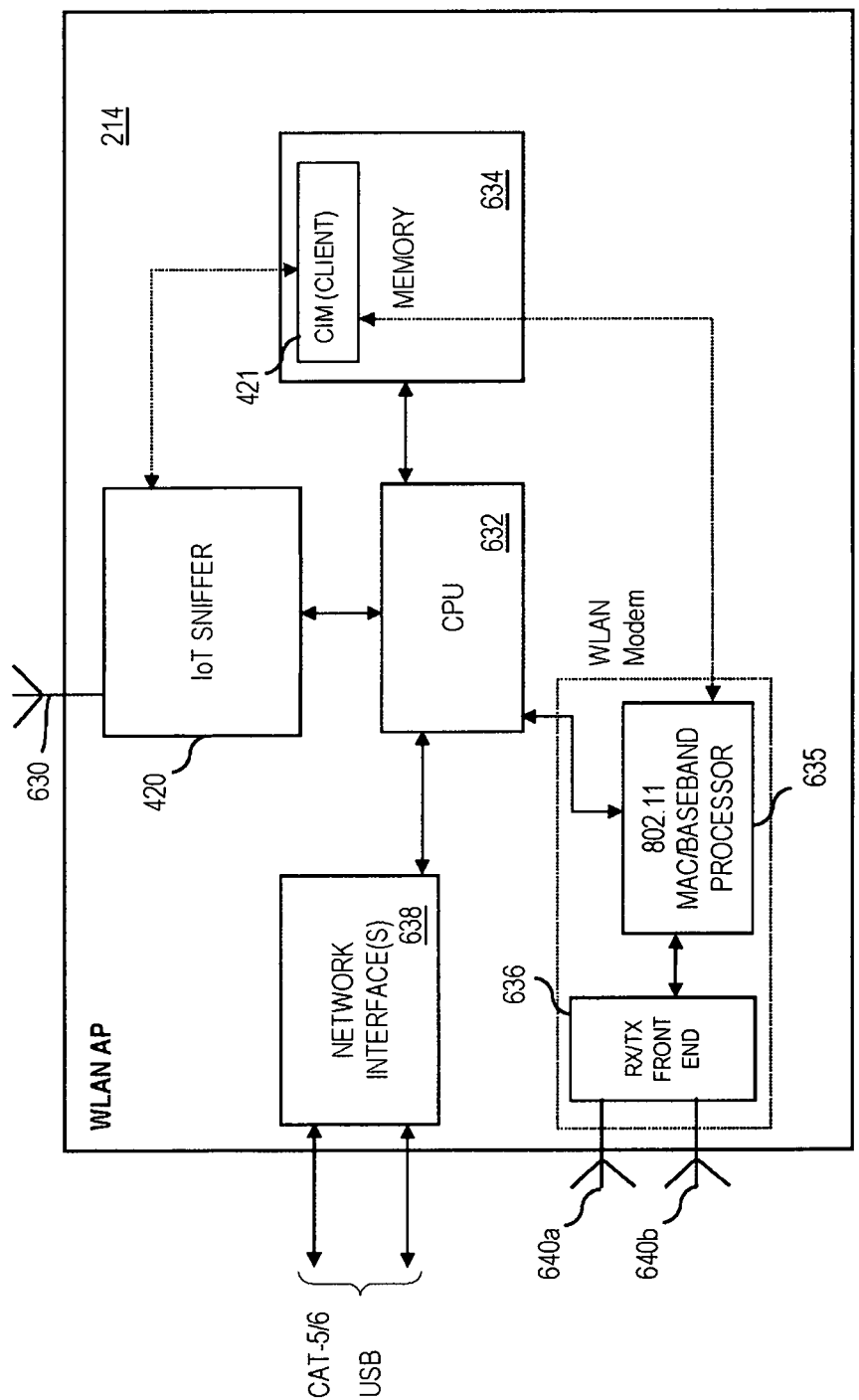
FIG. 6b is a functional block diagram of a second exemplary embodiment of a CIM-enabled client device apparatus (WLAN AP or gateway) according to the present disclosure.
Figures 1, 6B:
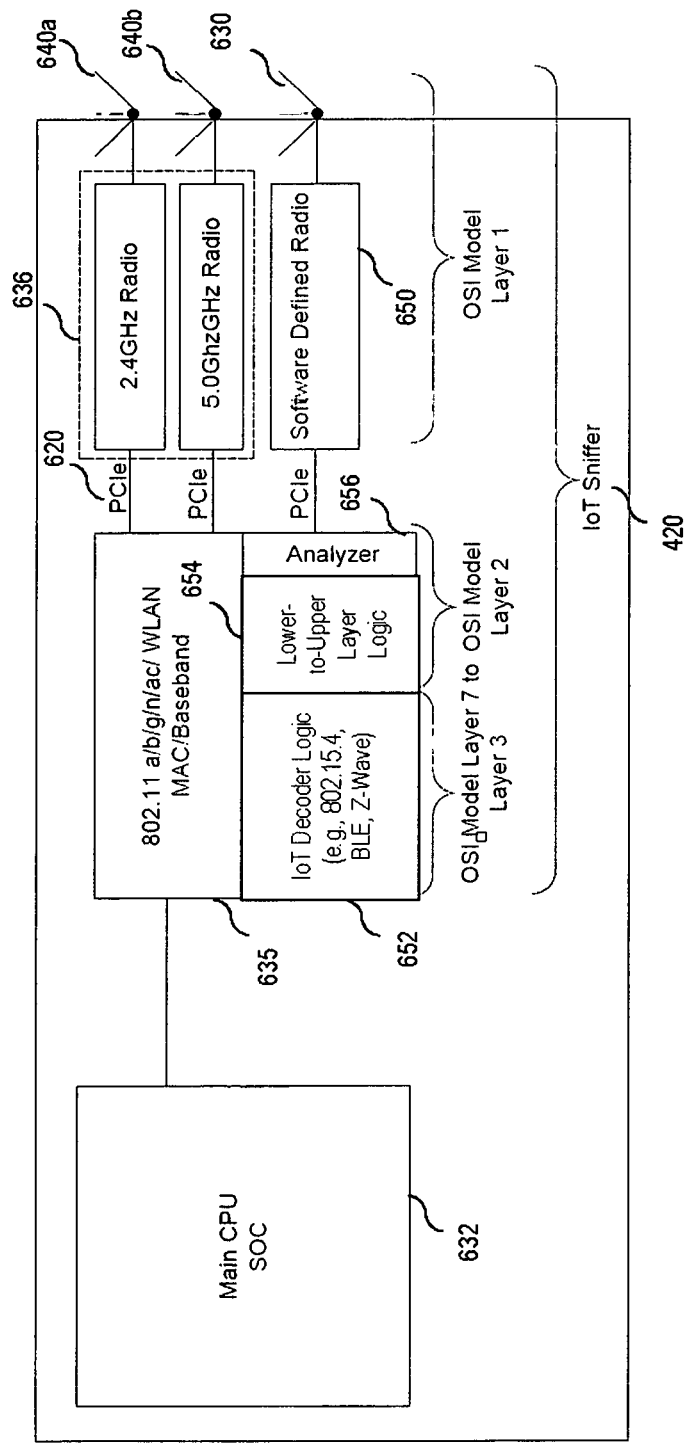
Figures 2, 6B:
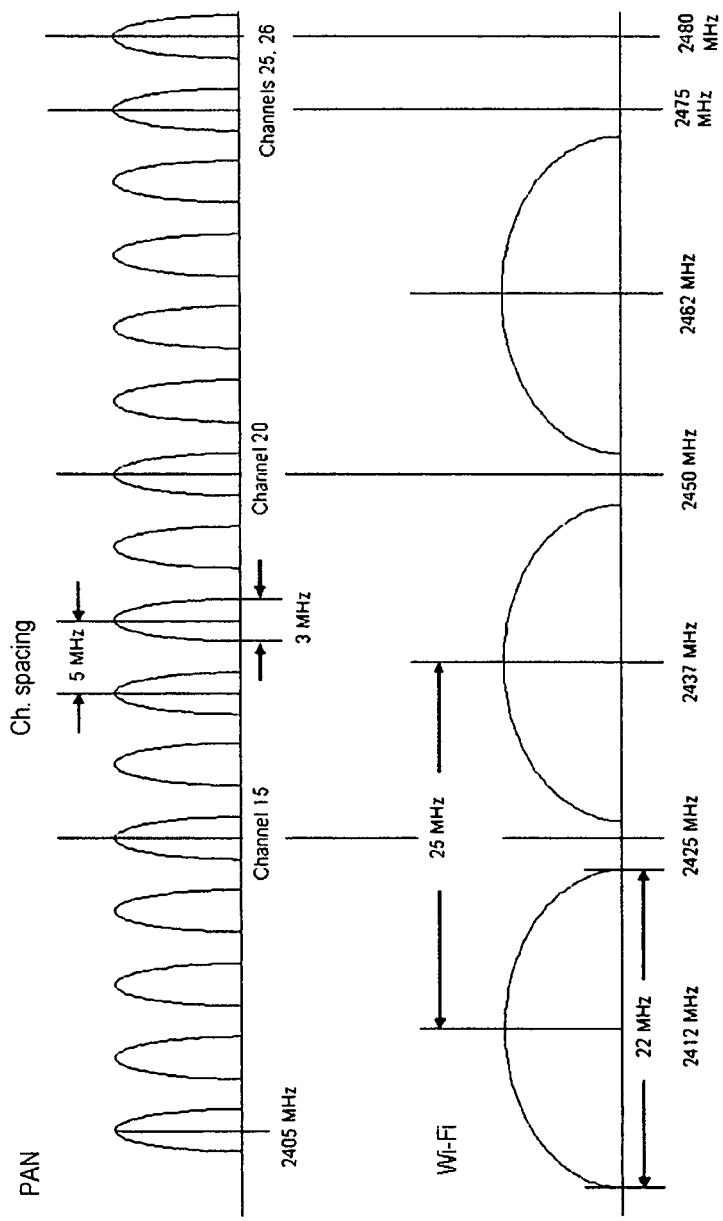
FIG. 2 is a functional block diagram illustrating an exemplary hybrid fiber network configuration useful with various aspects of the present disclosure.

FIG. 2 illustrates a typical service provider network configuration useful with the premises characterization and utilization features described herein.

As opposed to an unmanaged network, the managed service-provider network 200 of FIG. 2 advantageously allows, inter alia, characterization and management of a given user's premises via the client devices 206, cable modem 212, wireless access node(s) 214, or yet other apparatus at each premises 208-1, 208-n.

In certain embodiments, the service provider network also advantageously permits the aggregation and/or analysis of subscriber-, device-, and/or account-specific data (including inter alia, particular mobile devices associated with such subscriber or accounts) as part of the provision of services to users under the exemplary delivery models described herein. As but one example, device specific IDs (e.g., MAC address or the like) can be cross-correlated to MSO subscriber data maintained at e.g., the network headend(s) so as to permit or at least facilitate, among other things, (i) user authentication; (ii) correlation of aspects of behavior to particular subscriber demographics, such as for delivery of targeted advertising or content; (iii) user premises configuration and capabilities, including with respect to IoT devices installed, and (iv) determination of subscription level, and hence subscriber privileges and access to content/features. Moreover, device profiles for particular user devices (whether IoT enabled or otherwise) can be maintained by the MSO via the managed architecture 200.

The premises wireless access nodes 214 (e.g., WLAN, BLE, or 802.15.4) can be coupled to the bearer managed network via, e.g., a cable modem termination system (CMTS) and associated local DOCSIS cable modem (CM) 112 and router 213, a wireless bearer medium (e.g., an 802.16 WiMAX system), a fiber-based system such as FiOS or similar, a third-party medium which the managed network operator has access to (which may include any of the foregoing), or yet other means.

The various components of the exemplary embodiment of the network 200 include (i) one or more data and application origination sources 202; (ii) one or more content sources 203, (iii) one or more application distribution servers 204; (iv) one or more VOD servers 205, (v) client devices and/or Customer Premises Equipment (CPE) 206 (such as DSTBs and/or mobile devices), (vi) one or more cable modems 212, (vii) one or more routers 213, and (viii) one or more access nodes 214 (which may or may not include an embedded cable modem and router). The application server(s) 204, VOD servers 205 and CPE/client device(s) 206 are connected via a bearer (e.g., HFC) network 201. A simple architecture comprising one of each of certain components 202, 203, 204, 205, 212, 213, 214 is shown in FIG. 2 for simplicity, although it will be recognized that comparable architectures with multiple origination sources, distribution servers, VOD servers, and/or client devices (as well as different network topologies) may be utilized consistent with the present disclosure. For example, the headend 207 may include (not shown) a billing module, subscriber management system (SMS) and client/CPE configuration management module, cable modem termination system (CMTS) and 00B system, as well as LAN(s) placing the various components in data communication with one another. The headend may further include a conditional access system (CAS) and a multiplexer-encrypter-modulator (MEM) coupled to the HFC network 201 adapted to process or condition content for transmission over the network acquired from various sources. Typically, the channels being delivered from the headend 207 to the client devices/CPE 206 ("downstream") are multiplexed together in the headend, and sent to neighborhood hubs (as shown in the exemplary scheme of FIG. 2a) via a variety of interposed network components, including coaxial cable and fiber backhauls.

Figure 2A:
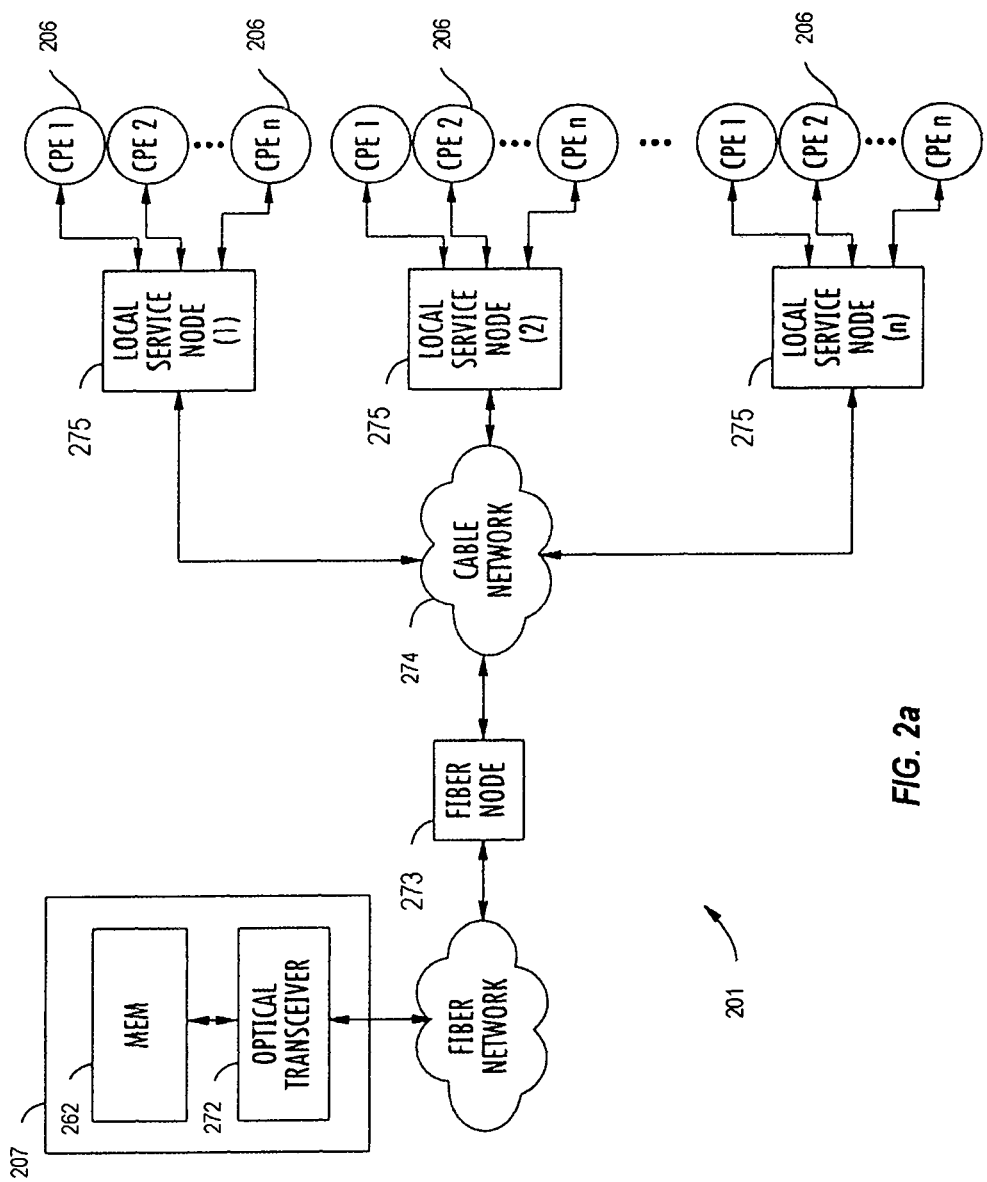
FIG. 2a is a functional block diagram illustrating one exemplary local service node configuration useful with various aspects of the present disclosure.

As shown in FIG. 2a, the network 201 of FIG. 2 comprises a fiber/coax arrangement wherein the output of the MEM 262 is transferred to the optical domain (such as via an optical transceiver 272 at the headend or further downstream). The optical domain signals are then distributed to a fiber node 273, which further distributes the signals over a coaxial cable distribution network 274 to a plurality of local servicing nodes 275. This provides an effective 1:N expansion of the network at the local service end.

Figure 3:
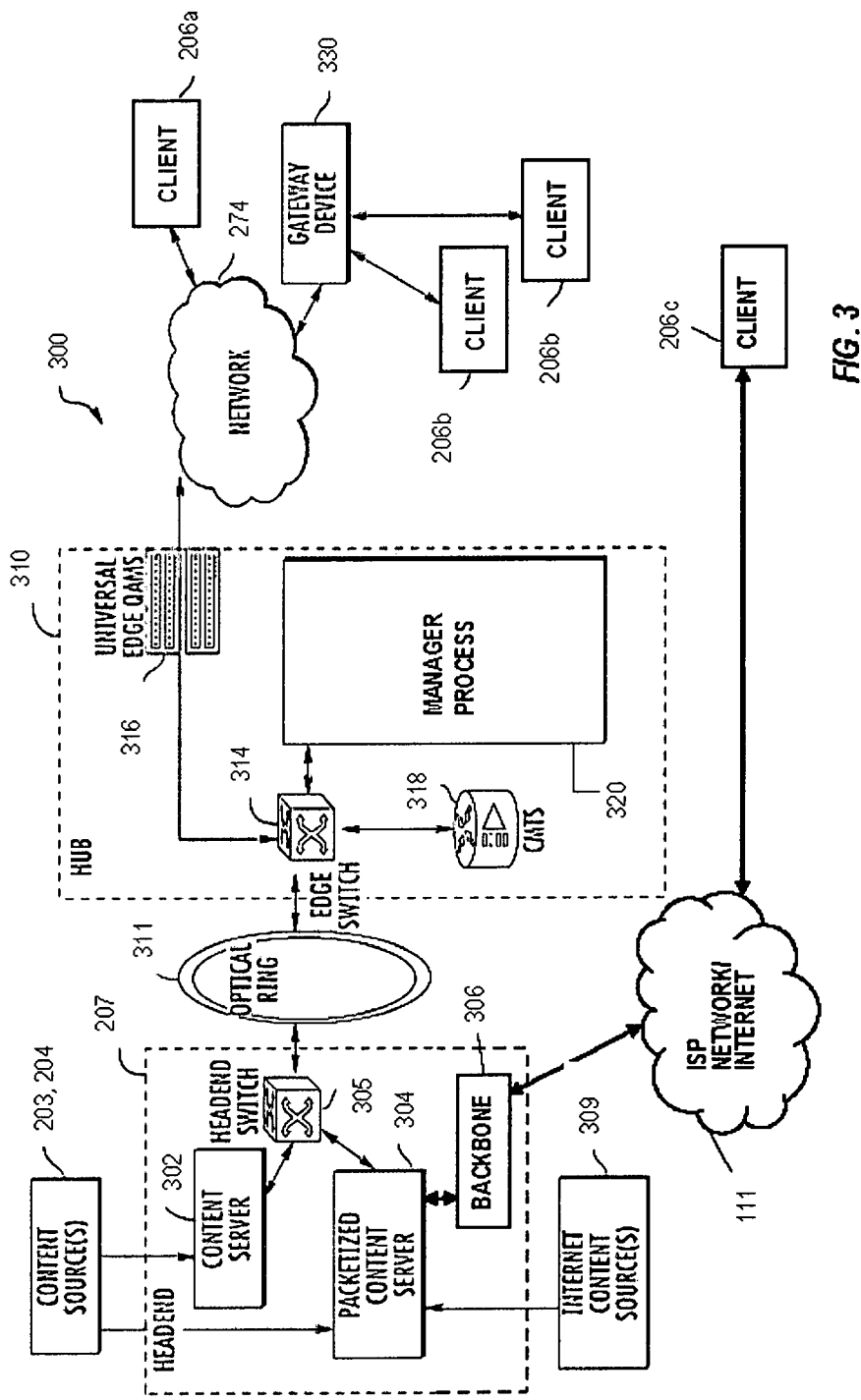
FIG. 3 is a functional block diagram illustrating one exemplary packetized content delivery network architecture useful with various aspects of the present disclosure.

FIG. 3 illustrates another exemplary network architecture for the delivery of packetized content that may be utilized consistent with the present disclosure. In addition to on-demand and broadcast content (e.g., video programming), the system of FIG. 3 may deliver Internet data services using the Internet protocol (IP), although other protocols and transport mechanisms of the type well known in the digital communication art may be substituted. The network architecture 300 of FIG. 3 generally comprises a managed content distribution network having one or more local headends 207 in communication with at least one hub 310 via an optical ring 311. The distribution hub 310 is able to provide content to various user devices, client devices 206, and gateway devices 330, via a network (such as the coaxial distribution network 274 of FIG. 2a).

Various content sources 203, 204 are used to provide content to a content server 302. For example, content may be received from a local, regional, or network content library as discussed in co-owned U.S. Pat. No. 8,997,136 entitled "APPARATUS AND METHODS FOR PACKETIZED CONTENT DELIVERY OVER A BANDWIDTH-EFFICIENT NETWORK", which is incorporated herein by reference in its entirety. Alternatively, content may be received from linear analog or digital feeds, as well as third party content sources. Internet content sources 309 (such as e.g., a web server) provide internet content to a packetized content server 304. Other IP content may also be received at the packetized content server 304, such as voice over IP (VoIP) and/or IPTV content. Content may also be received from subscriber and non-subscriber devices (e.g., a PC or smartphone-originated user made video). In one embodiment, the functionality of both the content server 302 and packetized content server 304 may be integrated into a single server entity.

A central media server located in the headend 207 may be used as an installed backup to the hub media servers as (i) the primary source for lower demand services, and (ii) as the source of the real time, centrally encoded programs with PVR (personal video recorder) capabilities. By distributing the servers to the hub stations 310 as shown in FIG. 3, the size of the fiber transport network associated with delivering VOD services from the central headend media server is advantageously reduced. Hence, each user has access to several server ports located on at least two servers. Multiple paths and channels are available for content and data distribution to each user, assuring high system reliability and enhanced asset availability. Substantial cost benefits are derived from the reduced need for a large content distribution network, and the reduced storage capacity requirements for hub servers (by virtue of the hub servers having to store and distribute less content).

It will also be recognized that a heterogeneous or mixed server approach may be utilized consistent with the disclosure. For example, one server configuration or architecture may be used for servicing cable, satellite, HFCu, etc., subscriber CPE-based session requests (e.g., those initiated from a user's DSTB), while a different configuration or architecture may be used for servicing mobile client requests. Similarly, the content servers 302, 304 may either be single-purpose/dedicated (e.g., where a given server is dedicated only to servicing certain types of requests), or alternatively multi-purpose (e.g., where a given server is capable of servicing requests from different sources).

The network 300 of FIG. 3 may further include a legacy multiplexer/encrypter/modulator (MEM) coupled to the network 300 adapted to "condition" content for transmission over the network. In the present context, the content server 302 and packetized content server 304 may be coupled to the aforementioned LAN, thereby providing access to the MEM and network via one or more file servers (not shown). The content server 302 and packetized content server 304 are coupled via the LAN to a headend switching device 305 such as an 802.3z Gigabit Ethernet (or "10G") device. Video and audio content is multiplexed at the headend 207 and transmitted to the edge switch device 314 (which may also comprise an 802.3z Gigabit Ethernet device).

In one exemplary delivery paradigm MPEG-based video content may be delivered, with the video transported to user PCs (or IP-based client devices) over the relevant transport (e.g., DOCSIS channels) comprising MPEG (or other video codec such as H.264 or AVC) over IP over MPEG. That is, the higher layer MPEG or other encoded content may be encapsulated using an IP protocol, which then utilizes an MPEG packetization of the type well known in the art for delivery over the RF channels or other transport, such as via a multiplexed transport stream (MPTS). In this fashion, a parallel delivery mode to the normal broadcast delivery exists; e.g., in the cable paradigm, delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast. Delivery of the IP-encapsulated data may also occur over the non-DOCSIS QAMs.

Individual client devices 206 of the implementation of FIG. 3 may be configured to monitor the particular assigned RF channel (such as via a port or socket ID/address, or other such mechanism) for IP packets intended for the subscriber premises/address that they serve.

In the switched digital variant, the IP packets associated with Internet services are received by the edge switch 314 (which is controlled by a management process 320 based on, e.g., operational or other considerations, such as advertising campaigns), and forwarded to the cable modem termination system (CMTS) 318. The CMTS examines the packets, and forwards packets intended for the local network to the edge switch. Other packets are in one variant discarded or routed to another component. As an aside, a cable modem is used to interface with a network counterpart (e.g., CMTS) so as to permit two-way broadband data service between the network and users within a given service group, such service which may be symmetric or asymmetric as desired (e.g., downstream bandwidth/capabilities/configurations may or may not be different than those of the upstream).

The edge switch forwards the packets receive from the CMTS to the QAM modulator, which transmits the packets on one or more physical (QAM-modulated RF) channels to the client devices. The IP packets are typically transmitted on RF channels that are different than the RF channels used for the broadcast video and audio programming, although this is not a requirement. As noted above, the client devices are each configured to monitor the particular assigned RF channel (such as via a port or socket ID/address, or other such mechanism) for IP packets intended for the subscriber premises/address that they serve.

In one embodiment, both IP data content and IP-packetized audio/video content is delivered to a user via one or more universal edge QAM devices 316. According to this embodiment, all of the content is delivered on DOCSIS channels, which are received by a premises gateway 330 and distributed to one or more client devices 206 in communication therewith. Alternatively, the client devices 206 may be configured to receive IP content directly without need of the gateway or other intermediary. As a complementary or backup mechanism, audio/video content may also be provided in downstream (in-band) channels as discussed above; i.e., via traditional "video" in-band QAMs. In this fashion, a co-enabled digital set-top box (DSTB) or other client devices could readily tune to the new (in-band) RF video QAM. This may even be accomplished via appropriate logic within the client devices (e.g., autonomously, or based on signaling received from the headend or other upstream entity, or even at direction of a user in the premises; e.g., by selecting an appropriate DSTB or other client device function).

In another variant, IP simulcast content and existing on-demand, voice, and broadcast content are all provided to the headend switch device 305 of FIG. 3. The headend switch 305 then provides the content to the optical ring 311 for provision to one or more distribution hubs 310. IP simulcast content is in one exemplary implementation retrieved from a plurality of content sources at an IPTV server.

The IP-packet content in the architecture of FIG. 3 is transmitted to subscriber devices via the universal edge QAM 316 and the edge network 274. The IP video ("simulcast") content is presented to client devices capable of receiving content over the DOCSIS QAMs. For example, the aforementioned gateway device 330 (as well as an advanced client device 206*a* such as an IP-enabled DSTB) may receive the IP simulcast. Legacy CPE may receive content via the gateway device 330, or via an audio/video "backup" MPEG transport stream as previously described.

In the illustrated embodiment, the gateway device 330 serves as a gateway to the IP content for other client devices 206*b*. The gateway device 330 may communicate with one or more connected client devices 206*b*, as well as utilize Wi-Fi or other wireless capabilities (where so equipped) to communicate wirelessly to other devices.

In parallel with (or in place of) the foregoing delivery mechanisms, the MSO backbone 306 and other network components can be used to deliver packetized content to the user's mobile end-user device (EUD) 206*c* via non-MSO networks. For example, "OTT" (over-the-top) content can be ingested, stored within the MSO's network infrastructure, and delivered to the user's mobile end-user device via an interposed ISP (Internet Service Provider) network and public Internet 111 (e.g., at a local coffee shop, via a Wi-Fi AP connected to the coffee shop's ISP via a modem, with the user's IP-enabled end-user device 206*c* utilizing an Internet browser or MSO/third-party app to stream content according to an HTTP-based approach).

It is still further appreciated that the delivery of content may include delivery from an "off-net" distribution hub (not shown) to another network (not shown), not associated with the MSO. In this embodiment, a requesting device (such as client device 206 or gateway 330) may request content from a local headend 207 which is transferred over both MSO-maintained ("on-net") and "off-net" networks advantageously.

Premises Characterization Architecture—

Figure 4:
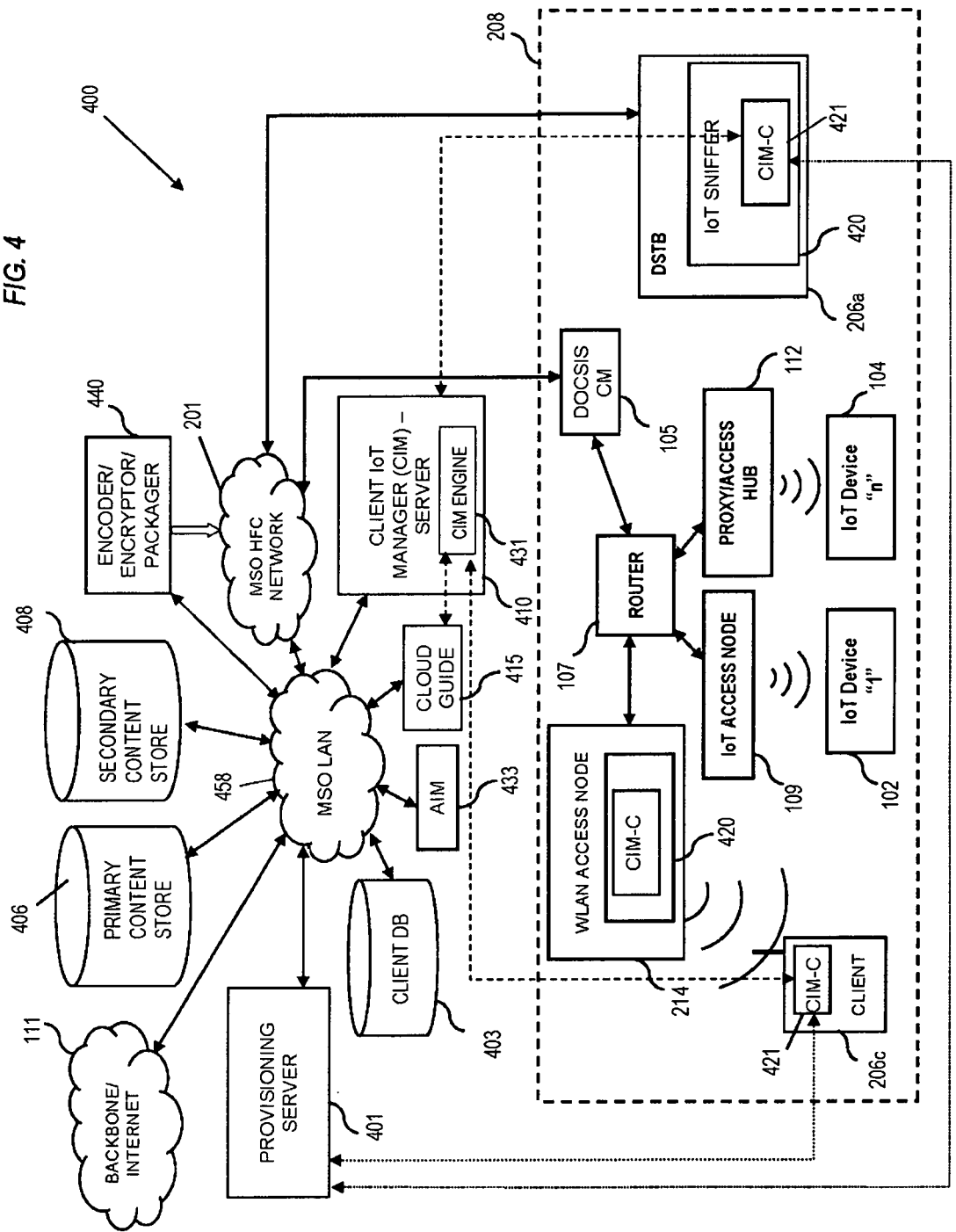
FIG. 4 is a functional block diagram of an exemplary architecture for user/subscriber premises characterization and management, in the context of a managed content delivery network such as that of FIGS. 2-3.

Referring now to FIG. 4, an exemplary architecture for user or subscriber premises characterization and management (including network-assisted functions such as population of the users EPR or targeted content or service delivery), is shown and described in the context of a managed content delivery network such as that of FIGS. 2-3. As shown, the architecture 400 generally utilizes the network operator's (e.g., MSO's) extant infrastructure including the MSO LAN 408, HFC network 201, and MSO backbone and internetworking function 111, as well as additional components and functions as now described.

Specifically, in the illustrated embodiment, the architecture 400 further includes a client IoT manager (CIM) process 410, client database 403, provisioning server 401, content stores (i.e., primary content store 406, such as for video content such as movies or other linear or non-linear programming, and secondary content store 408 for e.g., advertisements or promotions or other content). It will be appreciated that while shown as two (2) data repositories 406, 408, these stores may be combined, or alternatively comprise multiple distinct storage entities, including those operated or maintained by non-MSO third parties, as described elsewhere herein (e.g., the content sources 203, 204, 309 of FIG. 3), the illustrated configuration being merely exemplary. Moreover, the storage entities 406, 408 may be physically and/or topologically distributed within the MSO network or otherwise, such as where a plurality of local stores are utilized to service different geographic regions served by the MSO.

The CIM server entity 410 is, as described in greater detail below, configured to interface with various other network and/or client functions (depending on delivery modality) via its CIM engine 431 to manage premises IoT configuration functions, and to interface with the cloud EPG function 415.

The provisioning server 401 is utilized to provision client devices 206a, 206b with application layer software or middleware 421 which implements the IoT characterization techniques described in greater detail herein. In one variant, the client process 421 can operate substantially autonomously of the CIM server process 410, whereas in other embodiments, the client process 421 coordinates with the server process 410, such as to enable network-based analysis of data obtained from the client process 421, or to allow network-based configuration control over the client process 421.

The provisioning server 401 also communicates with the client database 403 via the MSO LAN 458, such as to (i) obtain client device configuration information, MAC address, or other information useful in characterizing the individual client devices (whether DSTB 206a, mobile user client 206c, CM 212, gateway 206b, or other); (ii) correlate individual client devices with particular network (e.g., IP) or other addresses; and (iii) obtain demographic data relating to user(s) of the clients, via e.g., subscription data, historical tuning activity, or other mechanisms.

The provisioning server 401 also maintains, for each client device provisioned, data relating the CIM client 421 such as installation status, version, etc. In one variant, the provisioning server 401 and client database 403 are used by the CIM server process 410 to characterize and utilize the individual capabilities of a given client, including native air interface components or functions (whether equipped with an IoT sniffer 420 or not) which may be accessible to the CIM server process 410, as described in greater detail below.

Also shown in the architecture 400 of FIG. 4 is a "cloud" guide function 415. As previously described, cloud-based EPGs (electronic program guides) are increasingly configured to provide a streamlined user experience, reduced device processing and storage footprint, and a consistent and simple mechanism for software upgrades across multiple different types of HW/SW platforms (e.g., different OEM devices), via e.g., HTML 5-based cloud apps. In the illustrated architecture 400, the cloud guide function 415 generates and transmits the cloud EPG data to the DSTB clients 206a such that each client can render and access the cloud EPG services. As discussed in greater detail below, the CIM server 410 (and CIM client 421 where utilized) can, in certain implementations, provide IoT-related data to the cloud EPG function 415 (e.g., via the MSO LAN 458) so as to enable, inter alia, generation of EPG displays or HTML5-based pages relating to IoT enumeration, status, network topology, and even IoT device placement in certain implementations.

Returning again to FIG. 4, also shown are wireless services within the premises 208, such as via a WLAN access node 214 also connected to the local router 107 (each of which may be combined with other components, such as the cable modem 105 and/or IoT hub/node 109, 112). The user's mobile client device 206c (e.g., smartphone or tablet) may further be equipped with a CIM-C client process 421, akin to the DSTB 206a, and may be utilized as an ad hoc "sniffer" for certain functions as described elsewhere herein in greater detail.

It is also appreciated that extant or newly installed IoT hubs or gateways such as those shown in FIG. 1 can be retrofitted or equipped with IoT sniffer capability which complements their existing capabilities. For instance, if a given manufacturer includes an IEEE 802.15.4 PAN interface on their hub/gateway to communicate with IoT devices in the premises (e.g., according to the manufacturer's proprietary protocols as described previously), BLE and/or Z-Wave "sniffer" capability can be added to that device, whether by the premises user (e.g., subscriber) or the MSO, such as in the form of a plug in module, box or dongle (not shown). The add-on module/box/dongle can be configured to communicate with an indigenous CIM-C process (e.g., running on the dongle), which can transmit the sniffed and/or processed data back to the MSO (such as via indigenous Wi-Fi AP or DOCSIS modem operated by the MSO within the premises). Since the existing IoT hub already knows (presumably) of its own communicative IoT devices, only those not conversant with the hub will be sniffed by the add-on sniffer module.

Moreover, the architecture 400 of FIG. 4 may be configured to service MSO subscriber wireless requests when the subscriber is outside their premises 208 and utilizing their wireless device 206c for rendering content (e.g., while at the local coffee shop), as in FIG. 3. In one variant, one or more wireless access nodes 214 (e.g., WLAN, CBRS, LTE small cell/eNodeB for LTE-U or LTE-LAA) are services by MSO cable modems 105 (FIG. 4) and the MSO wireless backhaul infrastructure to route the client service requests to the appropriate service entity within the MSO infrastructure. For example, an MSO subscriber might use their client device 206c to invoke an MSO-based app (e.g., "cloud EPG" app configured to run on the client native O/S such as Android) to interface with an OD (on-demand) video server within the MSO headend, such that the client can receive and render the requested video content stream. As previously described, the client EPG app might invoke an HLS-based streaming session serviced by MSO encoder/encryptor/packager entities 440, such as via transmitted manifest with URLs for the various segments or "chunks" of the video content. Note that this video delivery can similarly be supported with non-MSO backhaul/wireless infrastructure, such as where the client utilizes the backhaul of another service provider and the public Internetwork 111 to access the MSO video server/packager as opposed to using e.g., MSO in-band or DOCSIS QAMs.

Exemplary CLM Apparatus—

The exemplary embodiments of the CIM 410 described herein may be implemented using general purpose software and/or hardware resources, as configured as described below. For example, the software may comprise a Linux operating system (OS) based server application such as an exemplary Apache-based environment.

Figure 5:
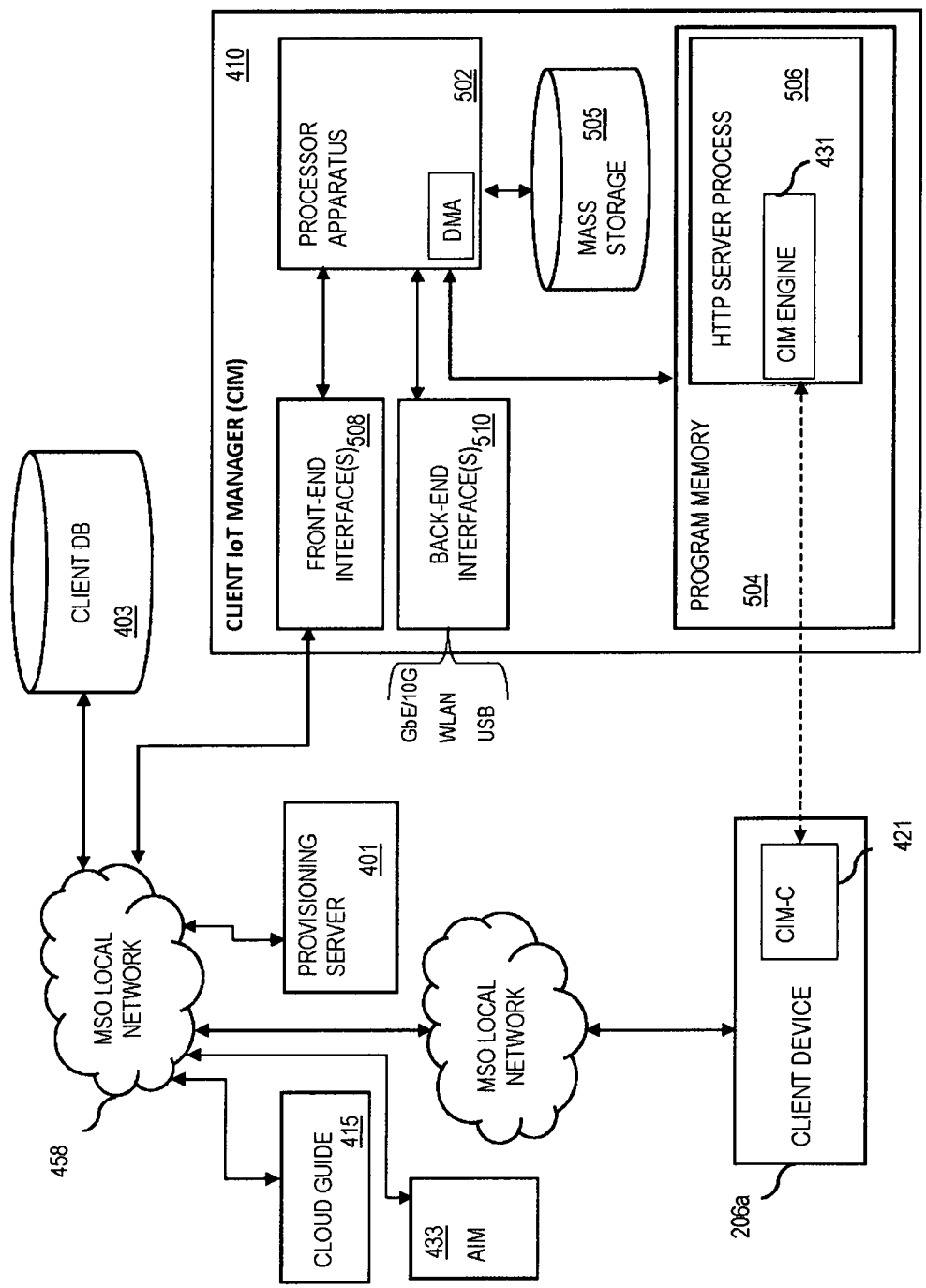
FIG. 5 is a functional block diagram of an exemplary embodiment of a client IoT manager (CIM) apparatus according to the disclosure, in the context of a managed content delivery network architecture such as that of FIG. 4.

Hardware resources can include for example general-purpose computing hardware. FIG. 5 depicts an exemplary embodiment of a CIM node apparatus 410 of a packetized network useful for latency management as described herein. The CIM 410 includes processing logic 502 (e.g., a processor) configured to execute one or more software modules 506 stored in program memory 504, a mass storage device 505 to support data storage, and one or more front-end interfaces 508, as well as one or more back-end interfaces 510. The front-end interfaces 508 include one or more network interfaces for communication (via a LAN 458 as shown) to the client DB 403, the cloud EPG function 415, and the provisioning server 401 as shown in FIG. 4, and/or other network "client" entities such as the advertising insertion manager (AIM) 433. The front-end interfaces 508 may utilize any prevailing protocol sufficient to enable timely communication with the various entities (such as GbE, 10G, etc.); notably, the CIM 410 of the illustrated embodiment communicates control data and messages with the corresponding "clients" or processes at the DSTB 206a or mobile client 206c, and the cloud EPG 415 and provisioning server 401 (as opposed to bandwidth-consumptive content data such as encoded video).

When communicating with the premises client(s) such as the illustrated DSTB 206a or mobile device 206c of FIG. 4, the CIM 410 may use any number of communication channels providing connectivity to the particular device. For example, for the DSTB 206a, an in-band QAM can be used for downstream communications, and OOB (out-of-band) channel for upstream communication such as data reporting from the DSTB/sniffer to the CIM 410. Alternatively, one or more OOB channels can be used for both downstream and upstream. Similarly, if the sniffer 420 is disposed within the cable modem 105 (FIG. 4), then one or more DOCSIS QAMs can be used for the downstream.

In the case of a mobile client 206c, any number of channels may be available, including via the premises WLAN (Wi-Fi) node 214, via an indigenous LTE modem of the client (not shown), or opportunistically when the user is "roaming;" e.g., at the aforementioned coffee shop, where they utilize the shop's WLAN AP for Internet service.

The back-end interfaces 510 may include high-speed data bus and/or wireless interfaces such as GbE, 10G, WLAN, USB, or others, for communication with external devices.

The memory 504 in one variant is characterized by lower access time, compared to the mass storage 505, the latter which comprises a nonvolatile medium (e.g., magnetic, optical, and/or charge based (e.g., flash), while the memory 504 may comprise a volatile medium (e.g., DDR2/DRAM, SRAM, and/or other).

In one or more implementations, the CIM node 410 is configured using commercial off-the-shelf computing platform (e.g., a Cisco UCS Blade with Intel processors, running VMWare ESXi 5.5, although it will be appreciated that other types of hardware/software environments may be used), which advantageously obviates the need for custom or specialized hardware. Hardware and/or software configurations of individual nodes (e.g., where multiple CIMs are used in the MSO network) may be set in accordance with requirements of a target application; e.g., for CIMs managing only certain types of clients such as DSTBs 206a, each CIM node may be configured identically for such purpose. However, in some implementations, the network may have a heterogeneous configuration, wherein the hardware configuration of individual CIM nodes is tailored in accordance with specific cost and/or performance requirements; for example, some may be purposely made more capable in terms of performance than others, such as where one CIM 410 services or manages a greater number of client devices/IoT sniffers 420, or requests for device characterization or profiling, or manages clients with different capabilities/configurations requiring less or more "active management" or support by the CIM 410 (such as in the case where the client/sniffer off-loads processing and/or analytics to the cloud, via the CIM 410).

As shown in FIG. 5, the CIM 410 includes an HTTP server process 506 and CIM engine 431, the latter which implements the logical functionality of the CIM 410, including communication with the corresponding CIM client processes 421 disposed on the client devices 206a, 206c which are so equipped. It will be appreciated that while certain embodiments of the CIM-S 431 and CIM-C 421 functions described herein utilize cooperative operation, the present disclosure contemplates the scenarios where: (i) the CIM-S 410 is configured to operate autonomously (i.e., without a corresponding CIM-C 421); and (ii) the CIM functionality is performed at least in part autonomously by the "clients" (CIM-C's). For example, in one contemplated implementation, the IoT sniffer 420 is configured without any significant "intelligence;" rather, it merely obtains frequency band scan data or other data by virtue of the premises scanning/characterizing techniques described elsewhere herein, and forwards this data as it is accumulated (or on a periodic polling or push/pull basis) to the CIM-S 431 for analysis, such as to an designated port or socket of the CIM 410.

In another variant, sufficient CIM logic to selectively characterize the premises IoT environment and topology is resident on the client device 206c on which the CIM-C 421 is, such that interaction with the server (CIM-S) if any, is not required, such as where RF band scanning, lower layer communication, and other characterization functions—can be invoked and performed by the CIM-C 421 without affirmative communication with the CIM-S 431. In some instances, the CIM-C 421 may also be configured to enable the client 206a, 206c to render an HTML or other format page on the rendering device of the client directly, thereby obviating cloud communications. For example, in one implementation, the CIM-C 421 is embodied in an "app" (application program) operative to run on the client and, using the sniffer 420 or other indigenous modem of the client (as described elsewhere herein), obtain IoT device data, process the data so as to determine the desired information (e.g., identify of various devices for which an RF signal was detected in one or more of the bands of interest), and cause generation of a display including that information, whether graphically and/or textually. In one such variant, the app is configured to make one or more API calls to an MSO or third-party server as needed for the characterization analysis only; this is in contrast with the aforementioned network-based cloud EPG variant, wherein the cloud EPG server 415 is utilized to populate and generate the HTML5 page data including the IoT device information for delivery to the client via the MSO network.

CIM-Enabled Client Devices—

Figure 6C:
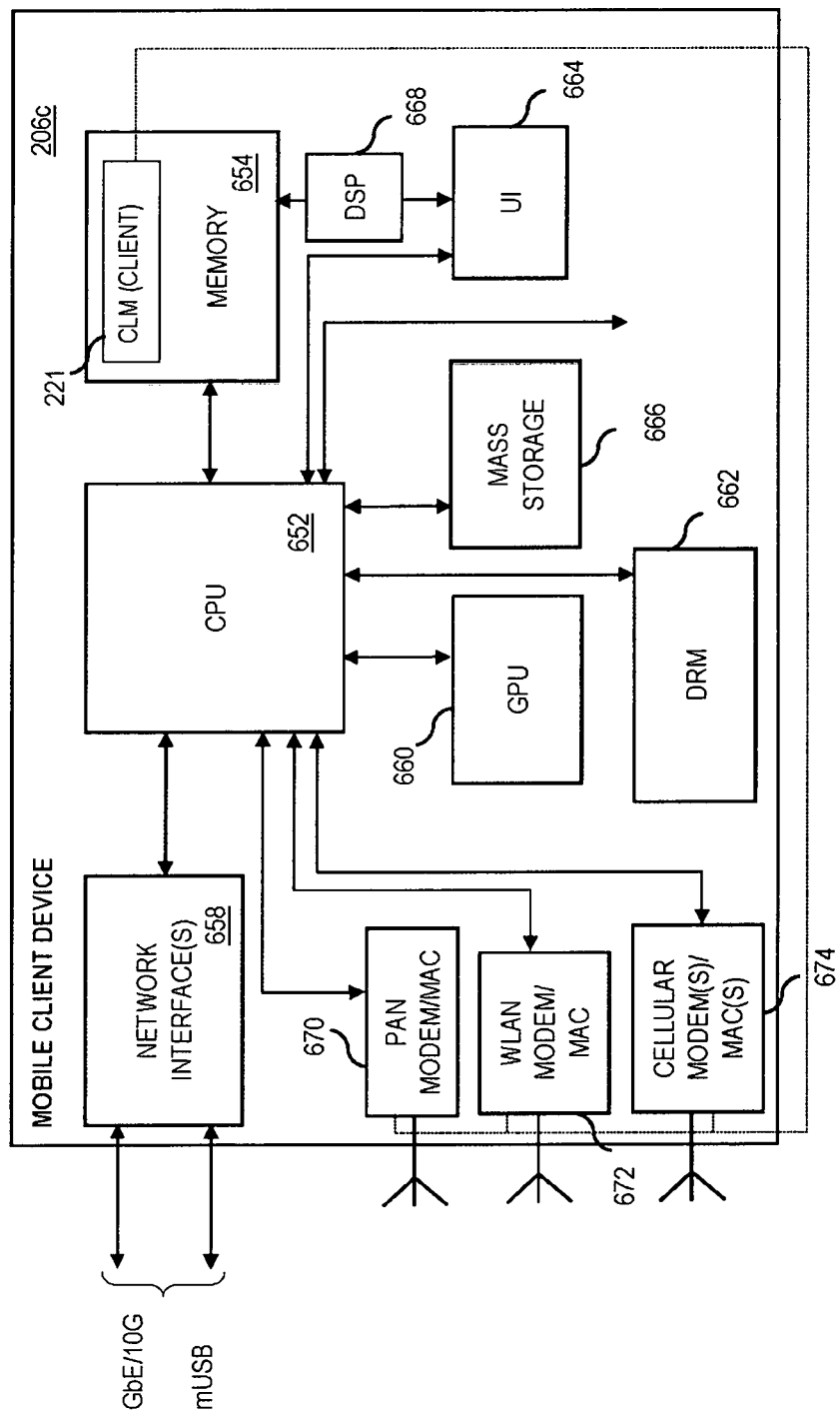
FIG. 6c is a functional block diagram of a third exemplary embodiment of a CIM-enabled client device apparatus (consumer electronic device) according to the present disclosure.

Turning now to FIGS. 6a-6c, various different implementations of the CIM-enabled client devices according to the present disclosure are described in detail.

FIG. 6a is a functional block diagram of a first exemplary embodiment of a CIM-enabled client device apparatus according to the present disclosure. As shown in FIG. 6a, the client device 206a (e.g., the DSTB shown in FIG. 4) includes, inter alia, a processor subsystem with CPU 602, a memory module 604, one or more radio frequency (RF) network interfaces 608, video co-processor 610, a secure element (SE) and DRM manager 612, and an RF baseband processing module 616.

In one exemplary embodiment, the processor subsystem 602 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 602 may also comprise an internal cache memory (e.g., L1/L2/L3 cache). The processor subsystem is in communication with a memory subsystem 604, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 602 is configured to execute at least one computer program stored in program memory 604 (e.g., a non-transitory computer readable storage medium). A video co-processor 610 and SE/DRM Manager 612 are also in data communication with the processor subsystem 602, and collectively the foregoing components include a plurality of computer programs/firmware configured to perform various functions such as conditional access/digital rights management, decryption, manifest unpacking, content decode, as well as communication with relevant network entities such as the CIM-S 431. Various other functions useful for and typical in consumer electronics including baseband management (e.g., transmit and receive functions via the baseband processor 616 and associated Tx and Rx chains of the RF front end 608. For example, in one embodiment, the Tx and Rx chains are part of an RF front end and tuner (part of the interface 608) used to receive and demodulate the QAM-256 signals transmitted over the MSO HFC network 101. Once the comparatively higher frequency signals received on the QAM(s) have been down-converted by the front end 608, the baseband processing module 616 is utilized to further process the down-converted signals, and may include digital filtration, FEC, CRC, and other PHY-related functions.

The tuner (or additional tuner) of the RF front end 608 is also capable of tuning to and receiving OOB (out-of-band) signals on an OOB channel provided by the MSO for e.g., low bandwidth communications. The RF front end 608 also comprises an OOB transmitter module, useful for transmitting OOB data communications (such as the IoT "sniffed" raw or processed data) upstream for delivery ultimately to the CIM-S engine 431 (FIG. 4).

The network interface 608 generally further incorporates an assembly of filters, low noise amplifiers (LNAs), and power amplifiers (PAs) that are configured to receive/transmit a modulated waveform via the DSTB's coax interface.

In one or more embodiments, the video co-processor/manager and SE/DRM manager each include an internal cache or memory configured to hold data associated with one or more functions (e.g., decoded video frames, decryption keys, etc.). In some embodiments, application program interfaces (APIs) such as those included in an MSO-provided mobile application such as the CIM-C 421, or those natively available on the client device 206a, 106c (e.g., as part of the decode/display application, or exclusively internal to the RF baseband or SE/DRM manager modules 616, 612) may also reside in the internal cache(s), or other memory 604.

The DSTB 206a of FIG. 6a further includes an IoT sniffer device 420 as previously referenced. In one embodiment, the sniffer device 420 is configured to characterize one or more sub-bands within one or more identified RF bands commonly used by IoT equipment. As an aside, it is contemplated that in nearly all applications, unlicensed spectrum will be utilized for IoT communications, such as that within the so-called ISM-bands. The ISM bands are defined by the ITU Radio Regulations (Article 5) in footnotes 5.138, 5.150, and 5.280 of the Radio Regulations. In the United States, uses of the ISM bands are governed by Part 18 of the Federal Communications Commission (FCC) rules, while Part 15 contains the rules for unlicensed communication devices, even those that share ISM frequencies. Table 2 below shows some typical ISM frequency allocations:

TABLE 2

| Frequency range | | Center frequency | Availability | Licensed users |
|---|---|---|---|---|
| 6.765 MHz-6.795 MHz | A | 6.78 MHz | Subject to local acceptance | Fixed service & mobile service |
| 13.553 MHz-13.567 MHz | B | 13.56 MHz | Worldwide | Fixed & mobile services except aeronautical mobile (R) service |
| 26.957 MHz-27.283 MHz | B | 27.12 MHz | Worldwide | Fixed & mobile service except aeronautical mobile service, CB radio |
| 40.66 MHz-40.7 MHz | B | 40.68 MHz | Worldwide | Fixed, mobile services & earth exploration-satellite service |
| 433.05 MHz-434.79 MHz | A | 433.92 MHz | only in Region 1, subject to local acceptance | amateur service & radiolocation service, additional apply the provisions of footnote 5.280 |
| 902 MHz-928 MHz | B | 915 MHz | Region 2 only (with some exceptions) | Fixed, mobile except aeronautical mobile & radiolocation service; in Region 2 additional amateur service |

TABLE 2-continued

| Frequency range | | Center frequency | Availability | Licensed users |
|---|---|---|---|---|
| 2.4 GHz-2.5 GHz | B | 2.45 GHz | Worldwide | Fixed, mobile, radiolocation, amateur & amateur-satellite service |
| 5.725 GHz-5.875 GHz | B | 5.8 GHz | Worldwide | Fixed-satellite, radiolocation, mobile, amateur & amateur-satellite service |

ISM bands are shared with (non-ISM) license-free communications applications such as IoT networks in the 915 MHz and 2.450 GHz bands, as well as wireless LANs and cordless phones in the 915 MHz, 2.450 GHz, and 5.800 GHz bands.

Additionally, the 5 GHz band has been allocated for use by, e.g., WLAN equipment, as shown in Table 3:

TABLE 3

| Band Name | Frequency Band | Dynamic Freq. Selection Required (DFS)? |
|---|---|---|
| UNII-1 | 5.15 to 5.25 GHz | No |
| UNII-2 | 5.25 to 5.35 GHz | Yes |
| UNII-2 Extended | 5.47 to 5.725 GHz | Yes |
| UNII-3 | 5.725 to 5.825 GHz | No |

The sniffer 420 is in data communications (e.g., via PCIe or other data bus structure) with the CPU 602 (see FIG. 6a-1), and in logical communication with the CIM-C 421 logic, the latter to enable the logic 421 to interface with the sniffer 420 to, inter alia, receive data obtained by the sniffer 420, and control its operation and/or configuration. The CIM-C 421 is also optionally in logical communication with the provisioning server 401 (i.e., for updates, configuration changes, or other functions), as well as the CIM-S 431, as discussed elsewhere herein. For instance, the CIM-C 421 may utilize a socket or port by which it can be addressed by the provisioning server 401 or CIM-S 431 via the interposed network architecture (i.e., the MSO LAN and HFC distribution network).

Figure 7:
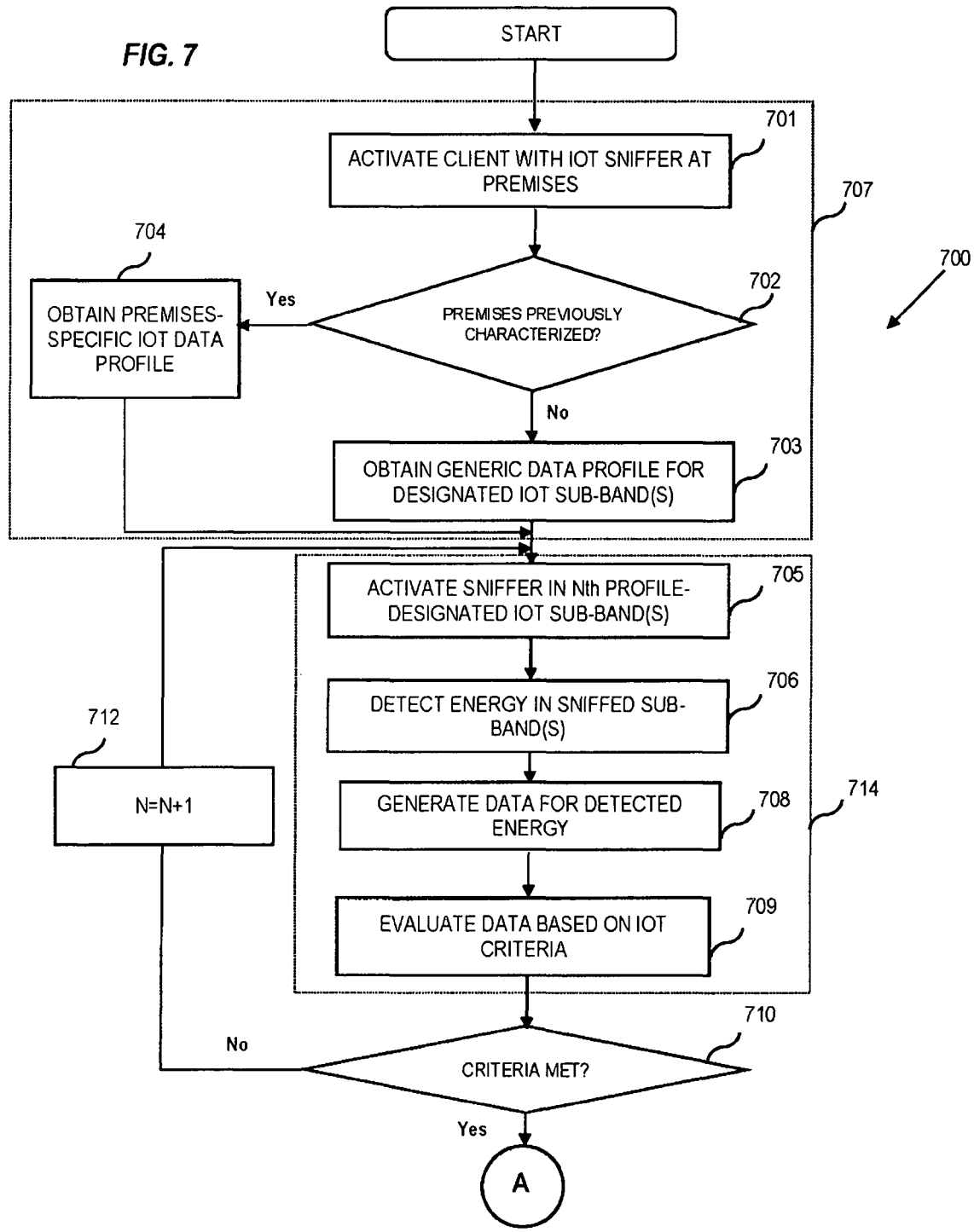
FIG. 7 is a logical flow diagram representing one embodiment of a method for gathering IoT device data from a premises according to the present disclosure.
Figure 7:
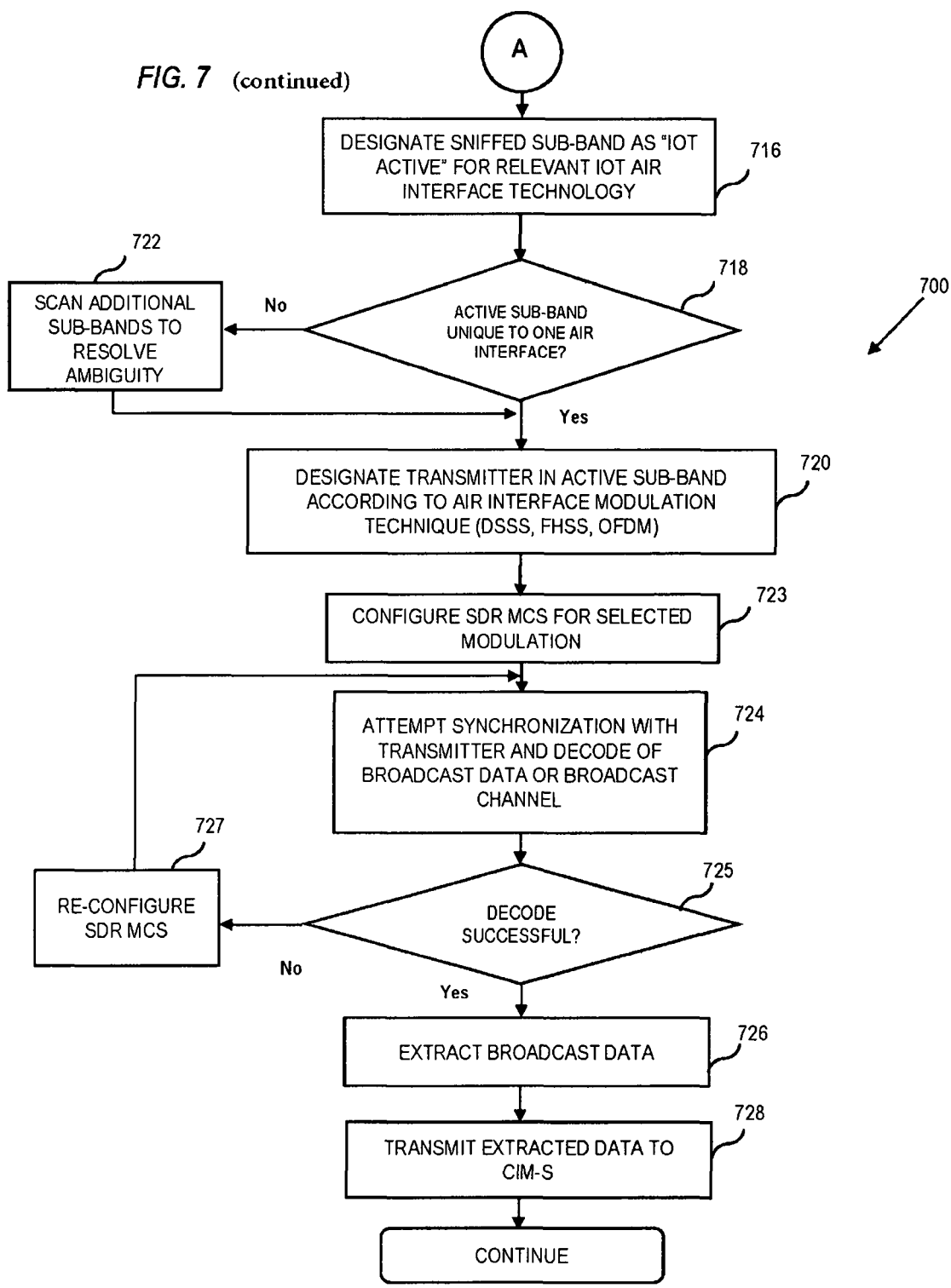
Figure 7A:
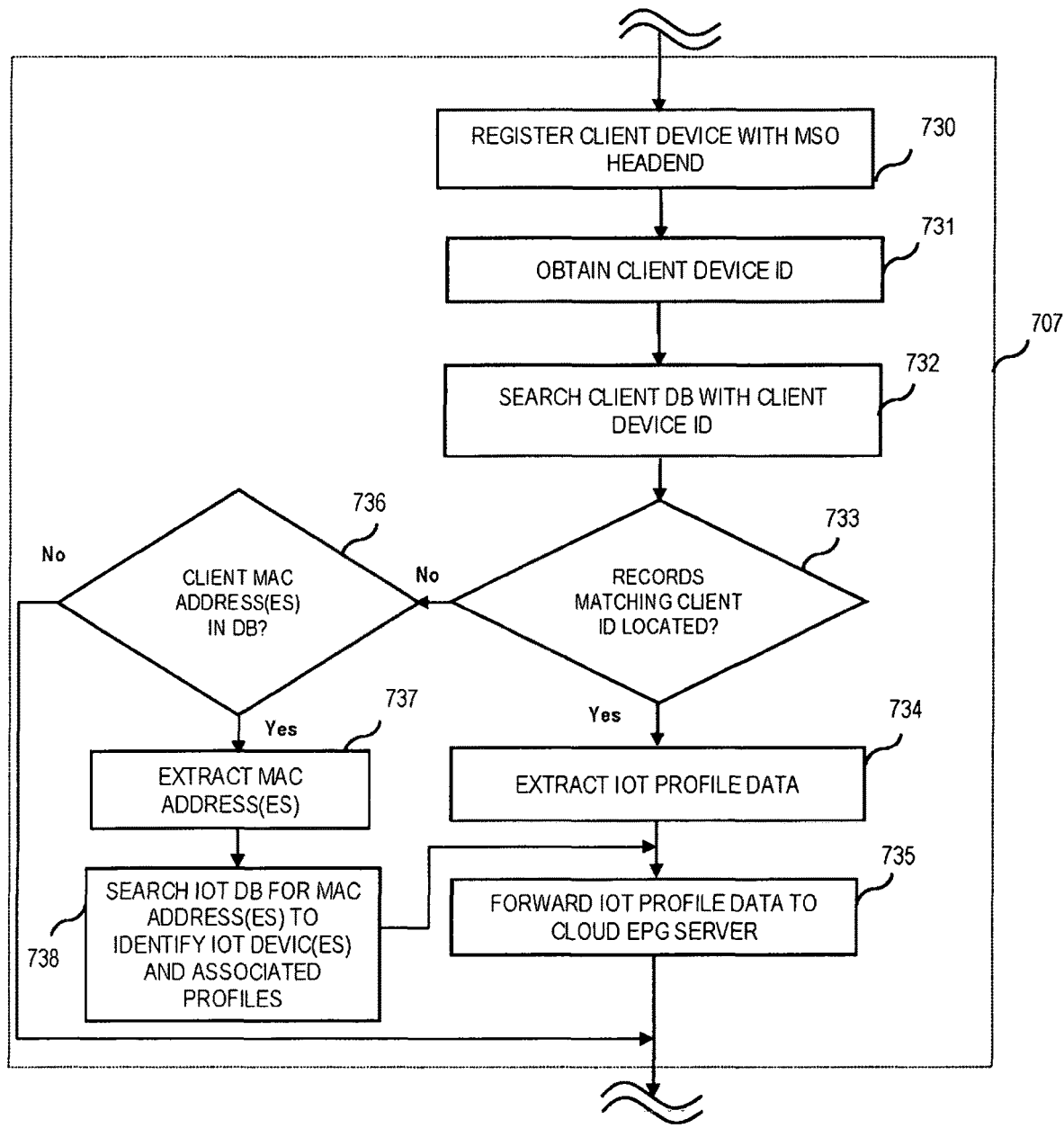
FIG. 7a is a logical flow diagram representing one implementation of a first (initiation) portion of the method for gathering IoT device data from a premises of FIG. 7.
Figure 7B:
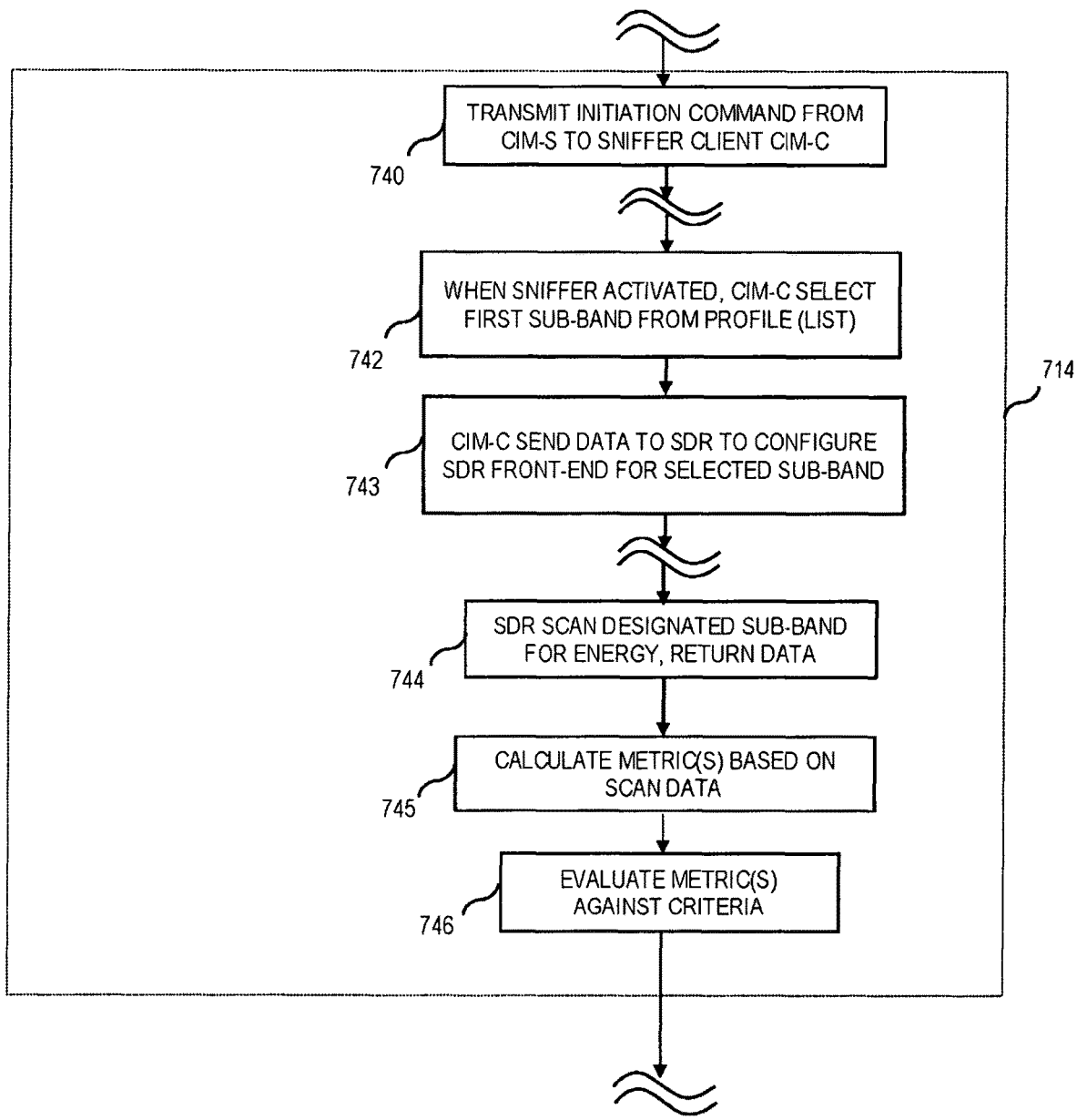
FIG. 7b is a logical flow diagram representing one implementation of a second (scanning) portion of the method for gathering IoT device data from a premises of FIG. 7.
Figure 7C:
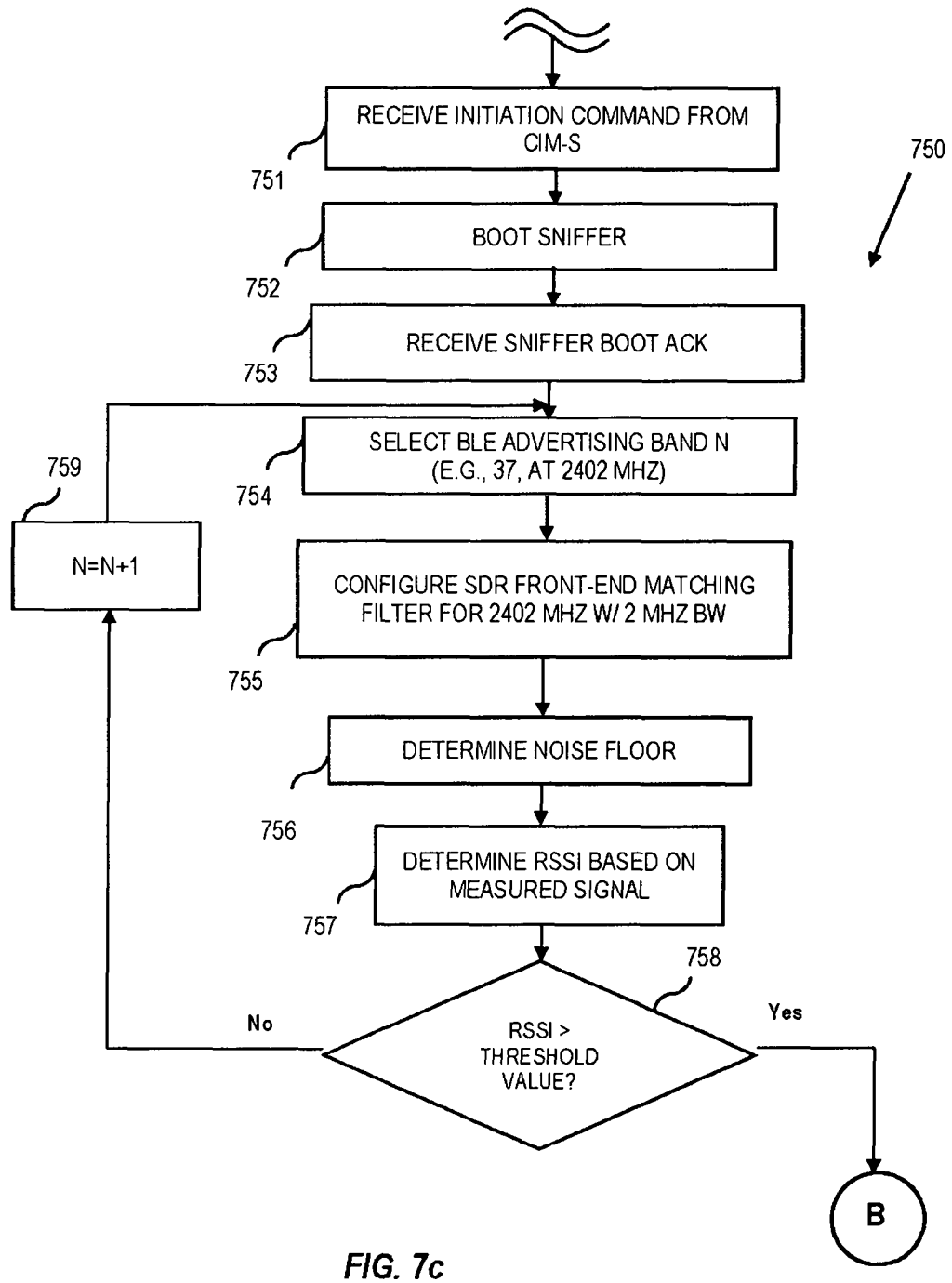
FIG. 7c is a logical flow diagram representing one particular implementation of the method of FIG. 7 in the context of a BLE IoT transmitter.
Figure 7C:
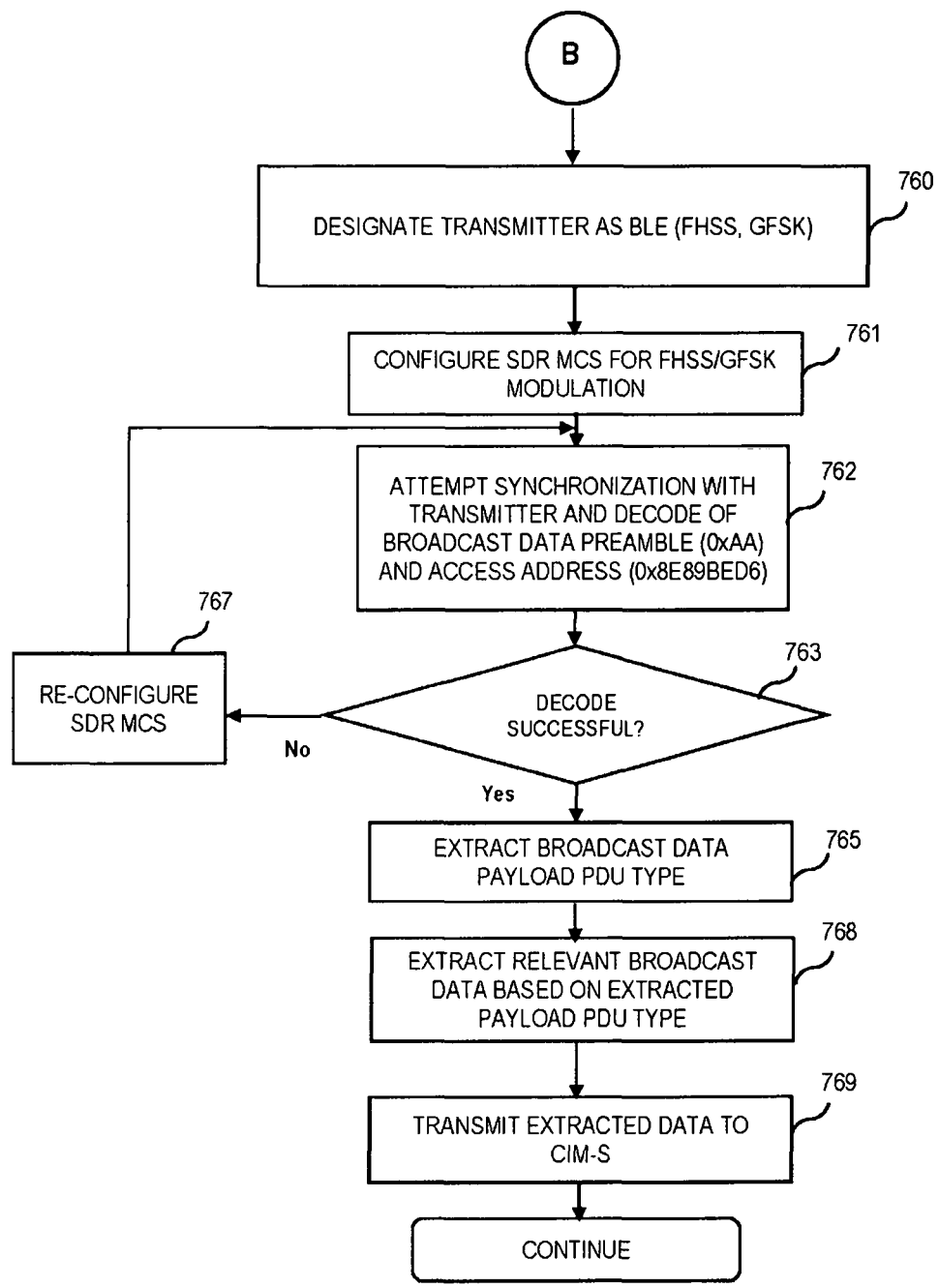
Figures 3, 7C:
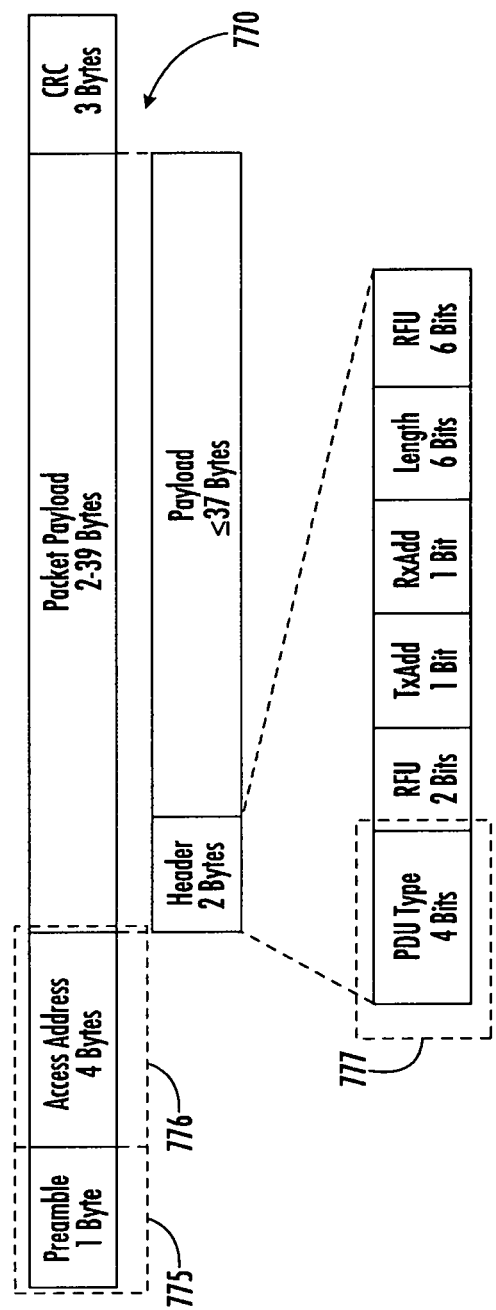
Figures 4, 7C:
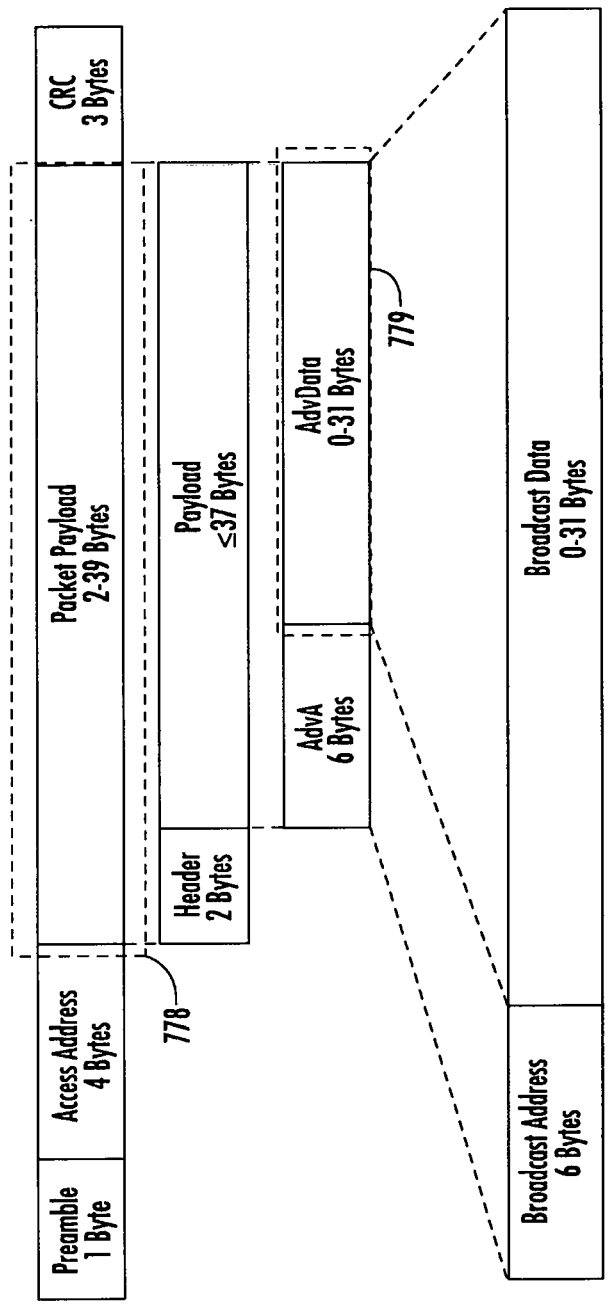

The operation of the sniffer 420 and related components including the CIM-S 431 and CIM-C 421 is described in greater detail with respect to FIGS. 7-7c-4 herein.

In terms of structure, one exemplary embodiment of the IoT sniffer 420 is shown in FIG. 6a-1. As shown, the sniffer 420 includes a software-defined radio (SDR) 622 having one or more antennae 615 tuned for the RF frequency band(s) of interest. For example, in one variant, the antennae 615 operate in the 2.4 GHz sub-bands associated with IEEE Std. 802.15.4 and BLE, so as to permit at least detection of energy and reception of data (e.g., beacons or broadcast packets) generated by IoT devices within the premises using those sub-bands. Advantageously, the SDR 622 of one exemplary implementation is software-controlled (e.g., by the CIM-C 421 and one or more of the higher-layer logical modules 617-619 shown in FIG. 6a-1, such as via firmware operative to execute on a microcontroller or ASIC of the SR chipset, or on the CPU 602) so as to configure its receive front-end chain (and in certain implementations discussed below, transmit chain) to operate at the prescribed frequency and utilize the prescribed MCS (modulation and coding scheme) associated with the "target" IoT interface(s). For instance, the SDR 622 can be configured to "sniff" for BLE energy signature within the three (3) "advertising" sub-bands shown in FIG. 1a (i.e., 37, 38, and 39 at 2402, 2426, and 2480 MHz respectively). The SDR 622 can be configured to sniff these sub-bands either in a prescribed sequence or order (including e.g., randomly), or simultaneously if the RF front end is configured to do so (e.g., with two or more parallel receive chains), under control of the logical modules 617-619 and the CIM-C 421. A PCIe or other data interface 620 is utilized within the DSTB 206a to provide internal data transfers between the SDR 622 and other components of the IoT sniffer 420.

In one embodiment, the analyzer logic module 619 operates at a lower layer of the protocol stack (here, the link layer) in conjunction with the PHY (SDR 622) to drive and control the SDR 622. This approach advantageously allows the SDR to scan each of the relevant (e.g., ISM) sub-bands in order to detect if there is energy present on one or more sub-bands. The analyzer module 619 in one implementation is configured to cause scan of the sub-bands of interest according to one or more scan schemes, such as via (i) systematic scan, (ii) random scan, and/or (iii) predictive/best known sub-bands to scan. This implementation also optionally includes logic for a configurable attribute to allow a prescribed amount of time (or other metric, such as number of scan operation cycles, number of events of certain type, etc.) to be spent on each of the ISM sub-bands. Inter-process data communication between the analyzer module 619 and the SDR 622 is utilized within the sniffer apparatus in order to transfer the aforementioned commands, data, configurable attribute values, etc.

Once energy meeting sufficient criteria (e.g., above an absolute or relative threshold value) is detected in a sub-band of interest, the analyzer is configured to (i) correlate the sub-band of interest to one or more air interface technologies within its "knowledge base," and (ii) based on the correlation, cause utilization of the proper decoding function(s) 617 within the device so that the decoder can identify the associated beacons, broadcast frames, and data payload of the communication stream issued from the IoT device transmitting the data or from e.g., the proxy/access hub to the IoT device. In the event that multiple air interfaces are identified by the analyzer module as being candidates (e.g., energy within a prescribed sub-band could relate to different interfaces in use), the analyzer conducts a hypothesis-testing algorithm to determine which of the candidates is correct; e.g., "trial and error" on synchronizing timing and/or decoding of certain types of packets, whereby success or failure will eliminate or ratify one or more of the candidates accordingly.

While shown as a common software module 617 in the figures, it will be appreciated that the decoding functions may be rendered as separate logical modules (whether software or firmware) and even in separate ICs of the sniffer apparatus. Moreover, in that certain upper layer IoT protocols may in fact be based on a common lower stack (e.g., 802.15.4), at least portions of the decoder modules (and interfaces 618 described below) may be aggregated accordingly.

The lower-to-upper layer logic interface module 618 is, in one implementation, configured to transfer data from the analyzer module 619 to the decoding function logic 617. Depending on the level of abstraction and integration of the decoder module(s) 617, the interface module 618 may be implemented as a unitary interface (i.e., all analyzer data/inputs are communicated through the interface 618 to the decoder module(s)), or as separate protocol-specific (or PHY-specific)

Higher layer logic (i.e., layers 3-7 of the OSI model, including the network through application layers as applicable for the particular implementation) is utilized in one implementation of the logical module 617 to process signals received by the SDR 622 in accordance with multiple candidate IoT protocols (e.g., Zigbee/Thread (for 802.15.4 PHY), BLE, and Z-Wave) in order to identify the type of IoT air interface in use, and glean whatever data is available from such signals to (i) identify the host IoT device transmitting the signals as to type (or specific identity, such as a particular serial number or MAC address for the device), and (ii) ancillary information such as network topology-related data.

Exemplary implementations of the SDR 622 of the IoT sniffer and aspects thereof are described in U.S. Pat. No. 9,654,149 to Piipponen, et al. issued May 16, 2017 and entitled "Multiple radio instances using software defined radio," U.S. Pat. No. 9,612,816 to Choi, et al. issued Apr. 4, 2017 and entitled "Method for operating software defined radio application," and U.S. Pat. No. 9,564,932 to Pack, et al. issued Feb. 7, 2017 and entitled "Software defined radio front end," each of the foregoing incorporated herein by reference in its entirety.

It is also noted that while the term "sub-band(s)" as used herein can refer to discrete frequencies or bands of frequency, it can also represent broader swaths of frequency spectrum. For instance, in one implementation, the SDR 622 is implemented to receive and analyze a broader range of frequencies (e.g., 800 MHz to 2.5 GHz) contemporaneously, such as to identify relative energy peaks within that spectrum (as opposed to analyzing a number of narrow bands successively). In one such implementation, a FFT (fast Fourier transform) is utilized by the SDR 622 to identify energy peaks at certain frequencies within the broader spectrum relative to the prevailing noise floor. Hence, the CIM-C (or CIM-S) logic may be configured to evaluate the relative magnitude of the peaks relative to the surrounding frequencies, such as via ratio of absolute amplitudes, to identify energy "spikes" that are putatively associated with IoT transmitters in the premises.

FIG. 6b is a functional block diagram of a second exemplary embodiment of a CIM-enabled client device apparatus according to the present disclosure. As shown in FIG. 6b, the client device 214 (e.g., the WLAN AP shown in FIG. 4) includes, inter alia, a processor subsystem with CPU 632, a memory module 634, one or more network data interfaces 638, WLAN Rx/Tx RF front end 636, and an 802.11 MAC baseband processing module 635.

As with the DSTB discussed above, the processor subsystem 632 of the WLAN AP may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 632 may also comprise an internal cache memory (e.g., L1/L2/L3 cache). The processor subsystem is in communication with a memory subsystem 604, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

Figure 1A:
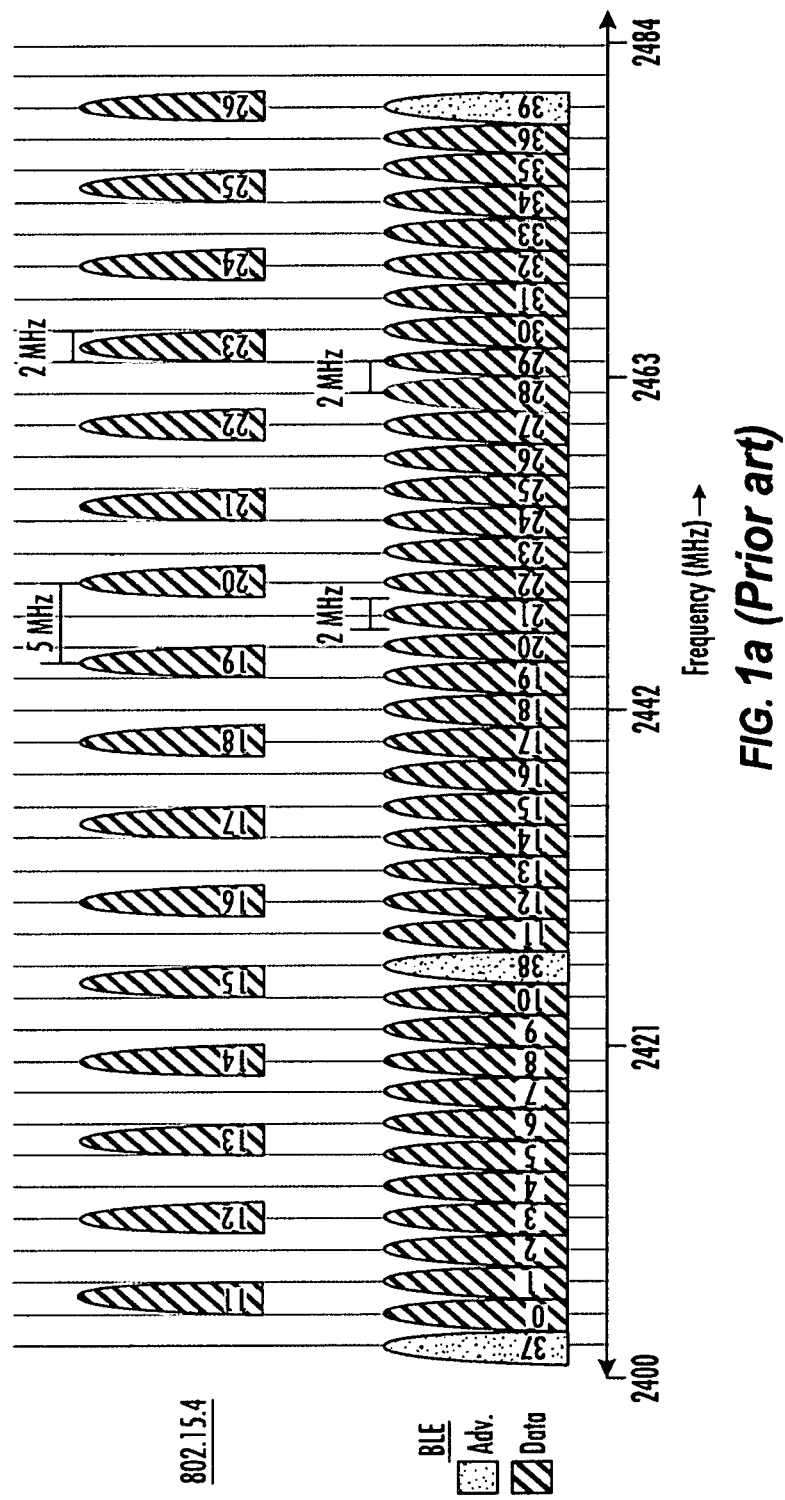
FIG. 1a is a graphical representation of frequency bands associated with prior art IEEE Std. 802.15.4 and Bluetooth Low Energy (BLE) wireless interfaces.

In this and various embodiments, the processor subsystem/CPU 632 is configured to execute at least one computer program stored in program memory 634 (e.g., a non-transitory computer readable storage medium), including functions of the CIM-C 421 to support the IoT sniffer 420, as well as communication with relevant network entities such as the CIM-S 431. Various other functions in support of the WLAN modem are also performed by the device, including baseband management (e.g., transmit and receive functions via the baseband processor 635 and associated Tx and Rx chains of the RF front end 636 and their MIMO or spatially diverse antenna elements 640a, 640b). In the illustrated embodiment, the AP 214 operates as a typical Wi-Fi modem, whether in the 2.4 GHz or 5.0 GHz bands, to provide WLAN connectivity throughout the presence. Advantageously, by having the IoT sniffer module 420 co-located with the AP 214, the typically centralized location of the AP can be leveraged for the characteristically shorter range of the IoT (PAN) interfaces. Moreover, even if the PAN interfaces use the same 2.4 GHz band as the PAN interfaces, interference to the WLAN modem is mitigated by the reduced signal strength, different sub-band allocations, and CSMA-CD mechanisms of the exemplary 802.15.4 MAC/PHY of the typical IoT device. Notably, IEEE Std. 802.11g/n implementations use a 20 MHz channel width, with 16.25 MHz allocated to subcarriers for the OFDM interface. Specifically, channels at 2412, 2437, and 2462 MHz are supported. Similarly, 40 MHz channels with 33.75 allocated to OFDM subcarriers may be used in certain modes of 802.11n for enhanced data throughput; e.g., centered at 2422 MHz. As shown in FIG. 1a and FIG. 6b-2 herein, 5 MHz-spaced channels of 3 MHz width are used by 802.15.4 in the same band. Hence, interference between 802.15.4 and 802.11 interfaces operating in the In one embodiment, the CIM-C 421 logic is configured to detect (via interprocess data communication between the 802.11 modem and the CPU 632) when the 802.11 modem is operating in the 2.4 GHz band, and either (i), suspend sniffing or other communication (e.g., transmission of "solicitations" as described below) in that band for a prescribed period of time, such as a randomized back-off interval which can increase as successive "collisions" occur (here, a collision can be determined to have occurred based on active scanning, or alternatively when the inter-process data communication from the WLAN modem indicates that the WLAN modem was active in the same sub-band as the sniffer 420 is intending to (or has) sniffed); and/or (ii) select sub-bands within the larger ISM band that are not being utilized by the WLAN modem at that given point in time. Moreover, the present disclosure contemplates that logic may be included within the WLAN modem (e.g., baseband processor 635) which enables it to coordinate with the sniffer 420 to avoid frequency sub-band overlaps between WLAN operations and sniffer operations. For instance, in one implementation, the WLAN baseband processor 635 is configured to transmit its channel allocations as a function of time within the 2.4 GHz band to the CIM-C 421 to enable the latter to schedule its "sniffs" or other operations within that same band on a non-conflicting (non-overlapping) basis, such as by sniffing sub-bands for IoT devices at times when they are not allocated to WLAN operations.

Notably, for the BLE air interface which used FHSS, the channel map is variable according to the hop sequence, and hence while synchronization between the sniffer 420 and the hop sequence is possible via inter-process communication, it is of far less concern, since the FHSS hop frequency will only transiently overlap with the sniffed frequency in the same ISM band selected by the sniffer logic. Moreover, if the advertising bands (37, 38, and 39 per FIG. 1a) only of BLE are sniffed by the sniffer 420 (e.g., to detect advertising broadcast packets emitted by the BLE IoT device), the number of channels potentially overlapping with WLAN operation is significantly reduced, especially since bands 37, 38 and 39 are widely and irregularly spread across the 2.4 GHz band (see FIG. 1a).

Obviously, where the WLAN interface operates in the 5 GHz band of 802.11, then no coordination between the logical entities of the WLAN modem and the CIM-C 421/ sniffer 420 is needed, since none of the prevailing IoT PAN interfaces to date operate within this band (although if such operations do occur, coordination similar to that in the 2.4 GHz band described herein can be implemented in this higher band).

Returning to FIG. 6b, the network interface 638 generally includes wireline data interfaces such as IEEE 802.3 Ethernet/GbE (via CAT-5/6 cabling), IEEE-1394, USB, or other, useful for transmitting data communications (such as the IoT "sniffed" raw or processed data) upstream for delivery ultimately to the CIM-S engine 431 (FIG. 4), as well as for transacting user data received/transmitted over the WLAN modem. For example, in one embodiment, the interface comprises a CAT-5 port for connection to a premises router 107 and/or DOCSIS modem 105 (FIG. 4); sniffed data generated by the sniffer 420 is packetized and sent via a network-layer session to the corresponding CIM-S 431 of the MSO network, as directed by the CIM-C 421.

It will be appreciated that while shown as separate components, two or more of the AP 214, router 107 and DOCSIS modem 105 can be combined into a common device, thereby further simplifying the architecture, although maintaining the sniffer 420 and WLAN AP 214 separable from the cable modem 105 does allow for greater flexibility in placement of the former, and hence prospectively better coverage of the premises with respect to the IoT PAN interfaces to be canvassed.

As shown in FIG. 6b-1, the sniffer 420 of the WLAN AP 214 includes a plurality of components and modules to support WLAN operation (including the MIMO antennae 640a, 640b, 2.4 GHz and 5.0 GHz radio chains for the corresponding bands of WLAN operation under e.g., 802.11n, and the 802.11 MAC/baseband processor 635). Additionally, the sniffer 420 includes an SDR 650, and supporting analyzer, 802.15.4, and BLE higher layer functional modules 652-656, which operate in analogous fashion to their counterparts in the architecture of FIG. 6a-1 herein.

FIG. 6c is a functional block diagram of a third exemplary embodiment of a CIM-enabled client device apparatus according to the present disclosure. As shown in FIG. 6c, the client device 206c (e.g., the user mobile device shown in FIG. 4) includes, inter alia, a processor subsystem with CPU 652, a memory module 654, one or more network interfaces 658, graphics co-processor (GPU) 660, a DRM manager 662, mass storage device 666, DSP 668, user interface (UI) 664 and an RF baseband processing module 616. The client device 206c also includes a PAN interface (e.g., Bluetooth) 670, WLAN (802.11) interface 672, and cellular data/voice interface(s) 674 (e.g., LTE for data with 3G/GSM for voice).

In one exemplary embodiment, the processor subsystem/CPU 652 may include one or more of a digital signal processor (DSP), microprocessor (e.g., RISC core(s) such as ARM core), field-programmable gate array, or plurality of processing components mounted on one or more substrates (e.g., printed circuit board). The processor subsystem/CPU 652 may also comprise an internal cache memory (e.g., L1/L2/L3 cache). The processor subsystem is in communication with a memory subsystem 654, the latter including memory which may for example comprise SRAM, flash, and/or SDRAM components. The memory subsystem may implement one or more of DMA-type hardware, so as to facilitate data accesses as is well known in the art. The memory subsystem of the exemplary embodiment contains computer-executable instructions which are executable by the processor subsystem.

In this and various embodiments, the processor subsystem/CPU 652 is configured to execute at least one computer program stored in program memory 654 (e.g., a non-transitory computer readable storage medium). A GPU 660 and DRM module 660 are also in data communication with the processor subsystem 652, and collectively the foregoing components include a plurality of computer programs/firmware configured to perform various functions such as conditional access/digital rights management, decryption, content decode and rendering, as well as communication with relevant network entities such as the CIM-S 431. Various other functions useful for and typical in consumer electronics including user interface via the UI 664 (e.g., capacitive touch-screen with soft function key generation) and speech recognition via the DSP 668 are provided in the exemplary device.

Notably, the embodiment of the device 206c of FIG. 6c does not include a dedicated sniffer module 420 (such as those of the prior embodiments), but rather utilizes and "repurposes" one or more extant air interfaces 670, 672, 674 of the consumer device 206c to perform environmental monitoring and characterization. For example, in one variant, the Bluetooth PAN interface 670 (now ubiquitous on consumer devices) is utilized, via inter-process communications between the CPU 652 (executing the CIM-C code) and the PAN modem 670, to monitor energy within the 2.4 GHz ISM band, and report data relating thereto back to the CPU/CIM-C. In that (i) the Bluetooth hardware operates in this range already, and (ii) BLE is backwards-compatible with extant Bluetooth implementations (see discussion supra), the PAN interface 670 can readily detect BLE emissions/broadcasts within sub-bands 37-39, and even process further data communications with the transmitting BLE-enabled IoT device intrinsically via its existing stack. Moreover, for non-BLE IoT devices, energy within at least sub-bands 15 and 26 of 802.15.4 (see FIG. 1a) overlaps with BLE sub-bands 38 and 39, and accordingly the BLE scan function can be used to detect 802.15.4 emissions in sub-bands 15/26. The other 802.15.4 bands also overlap with the data bands of BLE, and hence the PAN modem 670 can also be tuned to any of these sub-bands to receive energy and generate data relating thereto (e.g., in the form of received signal strength indication or RX or RSSI measurements already provided for within the Bluetooth protocol—RX is measured in milliWatts (mW) or decibel-milliwatts (dBm), whereas RSSI is a signal strength percentage—the higher the RSSI number, the stronger the signal), such data which is then passed via inter-process communication to the CPU 652 and CIM-C 421 for further analysis and/or transmission to upstream for delivery ultimately to the CIM-S engine 431 (FIG. 4) per any of the WLAN modem 672, cellular data modem 674, and/or network wireline interfaces 658.

It is further appreciated that the DSTB 206a of FIG. 6a, or the WLAN AP of FIG. 6b, can be configured to include a separate BLE/Smart interface (not shown) in addition to the sniffer 420, thereby leveraging the above-described indigenous BLE detection and communication capabilities of the standard Bluetooth interface and stack (e.g., as part of the "sniff" process, rather than utilize the SDR 622 of the sniffer 420, use such included Bluetooth interface to detect BLE IoT devices). Yet other combinations are possible, as will be recognized by those of ordinary skill given the present disclosure.

Similarly, since most all current 802.11 modules include a 2.4 GHz operating mode, the radio modem of the WLAN interface 672 can be used similarly to the aforesaid PAN modem 670 by the CIM-C 421 to obtain premises RF environment data in one or more sub-bands of interest within the 2.4 GHz band. 802.11 modems will typically generate data regarding RSSI and/or RCPI (received channel power indication). See for example FIG. 6b-2 discussed supra, wherein nominal 802.11 channels coincide with several 802.15.4 channels.

Even the LTE modem 674 can be utilized to detect energy in certain sub-bands, such as via indigenously generated SINR/RSRP/RSRQ. In LTE (3GPP standards), Signal-to-Interference Noise Ratio (SINR) is defined by Eqn. (1) below:

$$SINR=S/(I+N) \quad (1)$$

where:
- S is the power of measured usable signals, such as reference signals (RS) and physical downlink shared channels (PDSCHs);
- I is the average interference power; the power of measured signals or channel interference signals from e.g., other cells; and
- N is background noise, which can be correlated to measurement bandwidth and receiver noise coefficient(s).

In Eqn. (1), all quantities are generally measured over the same frequency bandwidth and normalized to one subcarrier bandwidth. SINR is generally used as a measure of signal quality (and data throughput), but it is not defined in the 3GPP standards (and hence is not required to be reported to the network infrastructure; however, UE's (mobile devices in the LTE network) typically use SINR to calculate the CQI (Channel Quality Indicator) which they do report to the network.

RSRP is defined, per 3GPP, as the linear average over the power contributions (in W) of the resource elements (REs) that carry cell-specific reference signals within the considered measurement frequency bandwidth. The reference point for the RSRP determination is the antenna connector of the UE.

RSRP measurement, normally expressed in dBm, is utilized for ranking different candidate cells in accordance with their perceived signal strength.

Hence, by analogy, SINR and/or RSRP can be determined by the CIM-C equipped client(s) 206c, obtaining RSRP measurements for any (one or more) IoT devices within the client LTE modem range and sub-bands of interest. It should be noted that while LTE/3GPP systems generally operate within licensed spectrum (and hence by definition do not overlap with the ISM bands described above), recent initiatives for utilization of e.g., the 5 GHz unlicensed spectrum by LTE systems (e.g., LTE-Unlicensed (LTE-U) and LTE-License Assisted Access (LAA) may utilize unlicensed spectrum, such as the 5 GHz band. Hence, to the degree that the premises includes an LTE-LAA/LTE-U enabled client device 206c, it's LTE modem can feasibly be used for "sniffing" energy within unlicensed bands, including those utilized by IoT devices.

Alternatively (or in conjunction with the foregoing), Received Signal Strength Index (RSSI) and/or Reference Signal Received Quality (RSRQ) may be utilized for IoT detection. RSRQ is another signal quality metric, considering also RSSI and the number of used Resource Blocks (N); specifically:

$$RSRQ=(N*RSRP)/RSSI \text{(measured over the same bandwidth)} \quad (2)$$

In LTE, RSSI is a measure of the average total received power observed only in OFDM symbols containing reference symbols for antenna port 0 (e.g., OFDM symbol 0 and 4 in a slot) in the measurement bandwidth over N resource blocks.

Notably, the exemplary user device 206c of FIG. 6c, when embodied as a mobile device (e.g., smartphone, tablet, laptop, etc.), may be leveraged to opportunistically aid in more complete characterization of a premises, especially where the IoT devices are spatially distributed throughout the premises. Specifically, even when using IoT hub(s) of the type previously described, the IoT devices (and hubs) may be at different spatial locations and not all within range of one another (or of a single MSO-based sniffer such as the DSTB or DOCSIS modem 206a or WLAN AP 214 previously described). Hence, even if all IoT devices are active (e.g., at least periodically transmitting beacons or broadcast data/message), they may register at such a low energy level above the prevailing ambient noise threshold at the sniffer 420 so as to be undetectable. This is often a further consequence of the very low radiated RF power used by the interfaces, in order to conserve electrical (e.g., battery) power. Accordingly, in larger premises, a single sniffer-equipped static (non-portable) device may not completely characterize the premises IoT profile. Advantageously, the mobile client 206c can, however, monitor or sniff the IoT bands at various times/locations throughout the premises, under control of the CIM-C 421 (or even CIM-S 431 via the CIM-C). For example, in one implementation, the accelerometer and/or A-GPS receiver of the mobile device 206c can be used to determine if the mobile device is/has migrated to another location within the premises, and hence invoke an opportunistic "sniff" of the IoT RF environment at that location (which may be transitory). In one such implementation, coincidence logic indicating (i) motion of the device, and (ii) change in geographic coordinate, can be used to trigger such opportunistic sniff.

Methods—

Referring now to FIGS. 7 through 7c-4, various embodiments of the methods of gathering IoT device data for characterizing a premises IoT environment are shown and described.

FIG. 7 is a logical flow diagram representing one embodiment of the method 700 for characterizing the premises. As shown, the method 700 includes first activating the client device with IoT sniff capability (whether indigenous or otherwise, as in the devices 206a-206c previously described) per step 701. Next, per step 702, it is determined whether the premises associated with the device has previously been characterized for IoT profile. This can be accomplished by, in one embodiment, searching the client database 403 based on e.g., MAC address of the client, or other approach (e.g., associated IP address, or even physical address). In one implementation, the DB 403 is structured such that it cross-references particular sniffer-enabled client devices by uniquely identifying information with one or more files or other data structures containing IoT profile data (e.g., a listing of IoT devices for that premises, last scan date, etc.) such that the MSO can remotely determine (via the CIM-S 431) whether that particular sniffer-enabled client has been used to characterize the premises in question.

If the DB search indicates that a prior IoT characterization has been conducted for that premises, that data is accessed by the CIM-S 431 per step 704. If no prior IoT characterization has been performed, the CIM-S obtains or generates a generic template or profile, which in one implementation provides data to the CIM-S as to a variety of possible IoT devices and air interfaces. This generic data may be assembled for example by the CIM-S accessing an MSO or third-party IoT "knowledge" database (e.g., served by a third party Internet server or website maintaining such data current). The data may include for instance a listing of various IoT device types (by unique device type code or category), and associated air interfaces or protocol stacks (e.g., Zigbee, BLE, Z-Wave).

Per step 705, the CIM-C 421 of the client device is then instructed by the CIM-S 431 (e.g., via downstream OOB communication or other means as previously described) to scan a first (N=1) sub-band associated with a first air interface/protocol. Where the premises has been previously characterized, much if not all of the scan can be obviated by merely querying the user (e.g., via on-screen window or message of the cloud guide) as to whether any new IoT devices have been added to the premises since last scan (on date xx/yy/zzzz) in one implementation. Alternatively (or concurrently), the sniffer 420 and CIM-C 421 can conduct an abbreviated "refresh" scan, wherein known devices (from data obtained for last premises characterization) are confirmed, and any new devices are identified via scan and decode of broadcast data as described in detail subsequently herein.

In the exemplary embodiment, the SDR 622 of the client 206a is instructed by the CIM-C 421 (acting as proxy for the CIM-S 431) to tune its front end to the designated sub-bands (with sufficient bandwidth to cover the channel bandwidth of the "target" air interface standard, e.g., 2 or 3 MHz, so as to capture sufficient energy if present). For instance, as previously discussed, bands 37-39 can be targeted initially for BLE to determine the presence of an "advertiser."

Per step 706, each scanned or sniffed sub-band is monitored (e.g., for a sufficient period of time so as to ensure that at least two "advertisement" events or slots are encountered for BLE; see FIG. 7c-1).

Per step 708, data associated with the measured energy in the target sub-band is generated (e.g., which may be an absolute or relative energy measurement relative to the prevailing noise floor as discussed below), and evaluated (per steps 709 and 710) against one or more prescribed criteria. For instance, in one embodiment, a relative RSSI value is calculated (based on the noise floor) to generate an index or value, and this is compared to a predetermined value which would assure that in fact a transmitter exists in the target sub-band. For instance, a 0-10 scale might be used, wherein anything greater than a "3" is considered a positive indication of a transmitter. Alternatively, an absolute reference system might be used, such as a measurement in dbm or dbi, and a corresponding acceptance or threshold criterion specified therefor.

Moreover, as previously discussed, one implementation of the SDR 622 is configured to receive and analyze a broader range of frequencies (e.g., 800 MHz to 2.5 GHz) contemporaneously, such as to identify relative energy peaks within that spectrum (as opposed to analyzing a number of narrow bands successively). In one such implementation, a FFT (fast Fourier transform) is utilized by the SDR 622 to identify energy peaks at certain frequencies within the broader spectrum relative to the prevailing noise floor, with the CIM-C (or CIM-S) logic configured to evaluate the relative magnitude of the peaks relative to the surrounding frequencies, such as via ratio of absolute amplitudes as the threshold criterion, to identify energy "spikes" that are putatively associated with IoT transmitters in the premises.

Per step 712, if the criterion is not met as part of the evaluation of step 710, then the counter (N) is incremented by the CIM-S 431, and the next target sub-band in the generated or pre-existing premises profile (e.g., next higher band for that air interface/protocol).

Conversely, if the criterion is met in step 710, the method 700 proceeds to step 716, wherein the sniffed target sub-band is designated as "active" (e.g., a flag set indicating that this band putatively contains an IoT transmitter). Per step 718, the sub-band can be evaluated (e.g., by the CIM-S 431 or CIM-C 421) against other air interfaces to determine whether the sub-band is unique (e.g., is that sub-band used by more than one air interface, and if so which ones?). Notably, this analysis can also be built into the logic of the IoT premises profile template, such as where only one or more sub-bands that are unique to each given distinct air interface (e.g., BLE, 802.15.4, and Z-Wave) are targeted for scan, thereby de facto indicating the presence of that type of air interface only if the energy analysis indicates the presence of a transmitter in that sub-band.

Per step 722, if the target sub-band is not unique, one or more additional sub-bands may be selected by the CIM-S 431 to resolve any ambiguity. Alternatively, if the target sub-band is unique, then per step 720, the putative IoT transmitter is designated as belonging to a prescribed air interface, and its modulation (e.g., DSSS, OFDM, or FHSS) set.

Per step 723, the CIM-S (or CIM-C) transmit data to the SDR 622 of the sniffer 420 to configure its RF front end according to the determined modulation/coding scheme (MCS). In the exemplary embodiment, the front end of the SDR 622 is constructed such that it can flexibly adapt to the different modulation techniques, whether by re-use/reconfiguration of its components (e.g., configurable matching filter, rake receivers, and/or FFT processing), or simply having multiple distinct front ends (one for each modulation type) that can be individually selected. It is noted that literally any receiver configuration can generally perform the energy detection functions previously described without knowing the modulation scheme, and hence the sniffer SDR 622 need not know what it is "sniffing for" at least at that stage. It is appreciated, however, that the MCS can be specified at time of sniff if the sub-band is determined to be unique (e.g., if the target sub-band is only used by BLE, if can be presumed that FHSS with GFSK is used, and hence the sniffer SDR can be configured accordingly before the scan is commenced).

Per step 724, the SDR 622 attempts synchronization (e.g., timing, such as coordinating hop sequence for FHSS) with the transmitter according to the prevailing protocol/MCS, and decode of its broadcast data. By design, each of the air interface standards described above utilize broadcast data or channels (e.g., advertising broadcast data for BLE, beacon frames for 802.15.4 and Wi-Fi, PDCCH and similar for LTE, etc.) which can be detected and decoded in order to permit further data communication to proceed. As described below, in the particular example of BLE, the broadcast data packet includes a variety of useful information from the perspective of characterizing a premises for IoT devices.

Per step 725, the decode success is determined (e.g., via one or more criteria such as the FEC/CRC or other), and if successful, the relevant broadcast data is extracted from the received packet per step 726, and optionally transmitted upstream to the CIM-S 431 per step 728. If the decode was unsuccessful, then per step 727, the CIM-S (or CIM-C) directs the SDR 622 to reconfigure its MCS (e.g., according to a prescribed hierarchy) to attempt synchronization/decode again, until all possibilities are exhausted, at which point the CIM-C throws an error flag (not shown).

FIG. 7a is a logical flow diagram representing one implementation of the initiation portion 707 of the method 700. As shown in FIG. 7a, this implementation of the portion 707 includes first registering the client device 206a-206c with the MSO per step 730. For instance, at install (whether by subscriber or service tech), the DSTB 206a of FIG. 6a will establish communications via the HFC network to the MSO headend (see FIG. 4), such as via OOB channel, or other available channel (e.g., extant DOCSIS modem). AT this point, the new client 206a with sniffer 420 is registered in the client DB 403 and the CIM-S 431, such that the CIM-S is now aware of the sniffer-enabled client. Per step 731, the CIM-S obtains the client ID (whether MAC address, local/global device identifier, or other), and searches the client DB 403 (step 732) based on the ID to determine the existence of a prior IoT scan or other useful data associated with that particular client device or premises (as previously discussed). In the illustrated implementation, an MSO-assigned device ID is used as the first search parameter (steps 731-734) to locate any extant IoT profile data for the device/premises, since it may be more broadly used than the 64-bit MAC within the MSO database(s). For example, an MSO subscriber database typically correlates particular devices with subscriber and service addresses, thereby providing a ready framework for associating IoT device/scan data and related information uniquely to that subscriber/client device/premises.

Failing that, the CIM-S can attempt to identify the client device MAC per step 736 to attempt to locate the IoT devices associated with that particular client/premises (step 738).

Finally, at step 735, any extant IoT profile data that has been found using either approach is forwarded to the cloud guide function 415 (FIG. 4) for inclusion on the subscribers EPG display (i.e., "here's what we found for your premises IoT devices"). If no extant data is found, then the generic profile (template) is used as previously described with respect to FIG. 7.

FIG. 7b is a logical flow diagram representing one implementation of the sniffer configuration/initiation portion 714 of the method 700. As shown in FIG. 7b, this implementation of the portion 714 includes first transmitting an initiation command from the CIM-S 431 to the CIM-C 421 of the client via the HFC network or other data path (step 740). Per step 742, when the sniffer 420 has been activated, the CIM-C 421 selects the first sub-band from the IoT profile data (e.g., list), or has it selected for it by the CIM-S, and sends an inter-process message or command to the SDR 622 to enable configuration of the SDR front end for the selected sub-band(s) (step 743).

When configured, the SDR 622 scans the designated band(s) for energy, and reports the scan data per step 744. The returned data is then used (by the CIM-C or even CIM-S) to calculate metrics such as RSSI, relative/absolute signal level, or energy peak ratios per step 745, and use these metrics to evaluate the signals against prescribed criteria (step 746).

FIG. 7c is a logical flow diagram representing one particular implementation of the method of FIG. 7 in the context of a BLE IoT transmitter. It will be appreciated that while discussed in the content of BLE-specific values, data structures, and procedures, such method is readily extensible to other air interface standards/protocols (e.g., 802.15.4 or Z-Wave) by those of ordinary skill in the relevant arts when given the present disclosure. In this implementation 750, the method includes first receiving at the client 206 the sniffer initiation command from the CIM-S 431 (step 751), and booting the sniffer (e.g., by inserting an initialization command to cause the sniffer 420 to execute its firmware under command of the CIM-C 421) per step 752. The boot procedure is completed and acknowledged (step 753), and at step 754, the first BLE advertising band (see FIG. 1a) is selected, e.g., band 37 at 2402 MHz. The SDR front end is configured for this selected sub-band with sufficient bandwidth (e.g., 2 MHz) per step 755, and data for the noise floor optionally obtained per step 756. It is noted in passing that noise floor data may or may not be available to the sniffer/CIM-C, and depending on the metrics and approach of measurement used, may or may not be explicitly required. For example, using the aforementioned FFT/integration approach, the relative magnitude of amplitude of the peak(s) relative to the prevailing noise floor is used as a metric of energy, and hence the noise floor (and the magnitude of the peak) need not be explicitly known; just their relative ratio or relationship.

Per step 757, the metric (e.g., RSSI, peak-to-noise ratio, etc.) is determined based on the scan data, and the metric compared to the prescribed threshold per step 758.

At step 760, the putative IoT transmitter is then designated a BLE device (e.g., by the CIM-S based on the detection of sufficient energy within a BLE-unique band (37), and the SDR configured for FHSS/GFSK operation consistent with BLE per step 761.

Synchronization is attempted for the preamble/access address 775, 776 of the BLE broadcast data packet(s) 770 per step 762 (see FIG. 7c-3), and when successful per step 763, the broadcast payload PDU type 777 is extracted from the packet per step 765. From there, the relevant payload data 777 (FIG. 7c-4) is extracted per step 768, and transmitted to the CIM-S 431 per step 769. Attributes of the broadcast data packet 770 are described in greater detail subsequently herein.

If no decode of the broadcast packet preamble 775 is accomplished per step 762-763, then the MCS of the SDR 622 is reconfigured per step 767 to attempt to decode the next broadcast packet at the next advertisement event after reconfiguration is complete.

FIGS. 7c-1 and 7c-2 are graphical representations of prior art BLE advertising and connection event timing, respectively. As shown, for "advertising only" BLE devices, they merely advertise the broadcast packet(s) periodically. For connectable devices, the connection event(s), wherein data can be transacted between the entities, follow the initial advertisement(s).

As an aside, BLE (e.g., 4.2 and 5.0) specifies various categories of "beacons." Non-connectable beacons comprise Bluetooth low energy devices in broadcasting mode; they simply transmit information that is stored internally. Such non-connectable broadcasting does not utilize any receiving overhead, and hence achieves the lowest possible power consumption (i.e., the device wakes up, transmits data and goes back into a sleep mode). The internal data is hence restricted to what is only known to the device internally or what is available through external input via USB, UART, SPI, or other interface of the host device or transmitter. Conversely, connectable beacons are Bluetooth low energy devices in peripheral mode, which can both transmit and receive data. This allows a central or host device (e.g., a smartphone 206c or the client DSTB 206a) to connect and interact with services implemented on the beaconing IoT device, such as where a configurable beacon (device) is updated over the air (OTA) via the BLE interface.

The BLE broadcast data packet 770 (FIGS. 7c-3 and 7c-4) has a preamble 775 of 1 byte and is used for synchronization and timing estimation at the receiver. It always has a value of 0xAA for broadcast packets, as is the access address 776 (set to 0x8E89BED6). The broadcast data packet payload 778 consists of a header and payload. The header describes the packet type, and the PDU type 777 is used to define the purpose of the device. For broadcast applications, there are three different PDU types, as shown in Table 4 below. ADV_IND and ADV_NONCONN_IND refer to the connectable and non-connectable devices described above, while ADV_SCAN_IND comprises a non-connectable broadcast device that can provide additional information via scan responses.

TABLE 4

| PDU Type | Packet Name | Remarks |
| --- | --- | --- |
| 0000 | ADV_IND | Connectable undirected advertising event |
| 0010 | ADV_NONCONN_IND | Non-connectable undirected advertising event |
| 0110 | ADV_SCAN_IND | Scannable undirected advertising event |

The TxAdd bit (FIG. 7c-3) indicates whether the advertiser's address (contained in the payload) is public (TxAdd=0) or random (TxAdd=1). RxAdd is reserved, and does not apply to beacons. The Cyclic Redundancy Check (CRC) is used ensures data integrity for all transmitted packets.

The payload 778 of the packet 770 includes the advertiser's address along with user-defined advertised data (see FIG. 7c-4). These fields represent the beacon device's broadcast address and payload data. The broadcast address can be either public or random as noted above; a public address is specified in accordance with IEEE 802-2001 and uses an OUI (Organizationally Unique Identifier), which is obtained from the IEEE Registration Authority. Conversely, random addresses can be generated by the beacon device itself, and can be of multiple types depending on application.

Table 5 shows BLE advertisement data types 779 (FIG. 7c-4).

TABLE 5

| Advertisement Data Type | Value | Remarks |
| --- | --- | --- |
| Flag | 0x01 | Device discovery capabilities |
| Service UUID | 0x02-0x07 | Device GATT services |
| Local name | 0x08-0x09 | Device name |
| TX Power Level | 0x0A | Device output power |
| Manufacturer-Specific Data | 0xFF | User defined |

The first three bytes of the broadcast data (flags—0, 1, 2) define the capabilities of the BLE beacon device, per the BLE Core Specification. The format of these bytes is shown in Table 6 below.

TABLE 6

| Byte | Bit | Value |
| --- | --- | --- |
| 0 | | 0x02 (Length) |
| 1 | | 0x01 |
| 2 | 0 | LE - Limited Discovery |
| | 1 | LE - General Discovery |
| | 2 | BR/EDR not supported |
| | 3 | LE + BR/EDR (Controller) |
| | 4 | LE + BR/EDR (Host) |
| | 5-7 | Reserved |

Table 7 below shows the format of the manufacturer-specific data (see Table 5) of the packet 700.

TABLE 7

| Byte | Value | Remarks |
| --- | --- | --- |
| 0 | 0x03-0x1F | Length |
| 1 | 0xFF | Manufacturer data flag |
| 2 | 0x0D | Manufacturer ID |
| 3 | 0x00 | |
| 4-31 | | Optional user data |

The BLE packet format 700 allows a device to broadcast 25 bytes of manufacturer-specific data (ADV_IND or ADV_SCAN_IND). For non-connectable undirected advertising (ADV_NONCONN_IND), the maximum MSD length is 28 bytes.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of characterizing an Internet-of-Things (IoT) environment, the computerized method comprising:
    causing a software-defined radio (SDR) apparatus of a computerized client device to generate data relating to a sub-band;
    analyzing the generated data against one or more prescribed criteria;
    based on the one or more prescribed criteria being met, determining that the sub-band includes signals transmitted from an IoT transmitter;
    evaluating the sub-band against data relating to one or more wireless apparatus interfaces to determine whether the sub-band is utilized by more than one air interface;
    based on the determination indicating that the sub-band is not utilized by more than one air interface, designating the IoT transmitter as belonging to a prescribed air interface; and
    causing configuration of the SDR apparatus according to at least a modulation scheme associated with the prescribed air interface.

2. The computerized method of claim 1, further comprising:
    causing the SDR apparatus to attempt synchronization with the IoT transmitter according at least the modulation scheme in order to enable decode of broadcast data; and
    based a successful decoding of the broadcast data, causing transmission of at least a portion of the decoded broadcast data to a server apparatus.

3. The computerized method of claim 1, further comprising:
    causing the SDR apparatus to attempt synchronization with the IoT transmitter according at least the modulation scheme in order to enable decode of broadcast data; and
    based on an unsuccessful synchronization or decoding of the broadcast data, causing reconfiguration of the SDR apparatus according to at least a second modulation scheme.

4. The computerized method of claim 1, further comprising determining whether the IoT environment has been previously characterized, the determining comprising causing a search of a database based on an identifier associated with the computerized client device, the database comprising data relating a plurality of identifiers and respective ones of a plurality of data relating to environment characterization.

5. The computerized method of claim 4, further comprising, based on the determining whether the IoT environment has been previously characterized indicating that the IoT environment has not been previously characterized, obtaining generic IoT profile data, the generic IoT profile data comprising a data structure relating a plurality of IoT device type codes or categories and one or more air interfaces associated therewith.

6. The computerized method of claim 4, further comprising, based on the determining whether the IoT environment has been previously characterized indicating that the IoT environment has been previously characterized, obtaining IoT profile data specific to a premises associated with the computerized client device.

7. The computerized method of claim 6, wherein the obtaining of the IoT profile data specific to the premises associated with the computerized client device comprises accessing the database an obtaining the IoT profile data based on data identifying the IoT profile data as being specific to the premises.

8. Computerized apparatus configured to obtain data relating to use of one or more air interfaces within a premises, the computerized apparatus comprising:
    digital processor apparatus;
    software-defined radio (SDR) apparatus in data communication with the digital processor apparatus; and
    storage apparatus in data communication with the digital processor apparatus and comprising at least one computer program, the at least one computer program comprising a plurality of instructions which are configured to, when executed by the digital processor apparatus, cause the computerized apparatus to:
        select an advertising band associated with a type of transmitter apparatus;
        configure the SDR apparatus for the advertising band with sufficient bandwidth to receive scan data associated with the advertising band;
        determine at least one metric based on the scan data;
        determine whether the at least one metric meets or exceeds a prescribed threshold; and
        execute computerized logic configured to:
            (i) based on a determination that the at least one metric meets or exceeds the prescribed threshold, designate a computerized Internet-of-Things (IoT) device as the type of the transmitter apparatus; and
            (ii) based on a determination that the at least one metric does not meet or exceed the prescribed threshold:
                re-configure the SDR apparatus for another advertising band with sufficient bandwidth to receive second scan data associated with the another advertising band;
                determine at least one second metric based on the second scan data; and
                determine whether the at least one second metric meets or exceeds the prescribed threshold.

9. The computerized apparatus of claim 8, wherein the plurality of instructions are further configured to, when executed by the digital processor apparatus, cause the computerized apparatus to, based on the determination that the at least one metric meets or exceeds the prescribed threshold:
    configure the SDR apparatus according to a modulation scheme consistent with the type of the transmitter apparatus;
    cause the SDR apparatus to synchronize with the transmitter apparatus according to at least the modulation scheme;
    decode broadcast data from the transmitter apparatus; and
    transmission of the decoded broadcast data to a server apparatus.

10. The computerized apparatus of claim 8, wherein the plurality of instructions are further configured to, when executed by the digital processor apparatus, cause the computerized apparatus to:
    determine data relating to a noise floor; and
    generate an index or value based on the data relating to the noise floor;
    wherein:
        the at least one metric comprises a relative received signal strength indicator that is calculated based on the data relating to the noise floor, and the generation of the index or value is based on the relative received signal strength indicator; and the determination of whether the at least one metric meets or exceeds the prescribed threshold comprises comparing the index or value to the prescribed threshold.

11. The computerized apparatus of claim 10, wherein the determination of the data relating to the noise floor comprises utilization of a FFT (fast Fourier transform) by the SDR apparatus to identify one or more energy peaks at certain frequencies within a range of frequencies relative to a prevailing noise floor.

12. The computerized apparatus of claim 8, wherein the SDR apparatus is (i) integrated within a wireless LAN (WLAN) access point (AP), and (ii) configured for inter-process communication with a WLAN modem of the WLAN AP, the inter-process communication configured to enable coordination between the SDR apparatus and WLAN for avoidance of at least some RF interference between the WLAN modem and the SDR apparatus, the coordination comprising suspension of sniffing operations by the SDR apparatus on one or more radio frequency (RF) bands during periods of time the one or more RF bands are utilized by the WLAN AP for WLAN operations.

13. The computerized apparatus of claim 8, wherein the plurality of instructions are further configured to, when executed by the digital processor apparatus, cause the computerized apparatus to:
  determine at least a portion of a topology of a premises network within which a computerized client device is disposed; and
  transmit data relating to the determined at least portion of the topology to a cloud-based network guide function, the cloud-based network guide function configured to enable display of data relating to the determined at least portion of the topology on a rendering device of the premises;
  wherein a computerized process of a managed network and a client process associated with one or more of (i) the SDR apparatus, (ii) the computerized client device, or (iii) the rendering device, are configured to coordinate to enable (i) network-based analysis of data received from the client process and (ii) network-based configuration control over the client process.

14. The computerized apparatus of claim 8, wherein the configuration of the SDR apparatus for the advertising band with the sufficient bandwidth to receive the scan data associated with the advertising band comprises utilization of the SDR apparatus to detect energy in one or more prescribed RF bands associated with a computerized IoT device, the utilization of the SDR apparatus comprising:
  analysis of the one or more prescribed RF bands to determine whether the one or more prescribed RF bands are unique to a prescribed air interface, the analysis comprising evaluation of data relating to at least one air interface other than the prescribed air interface to determine that the at least one other air interface does not utilize the one or more prescribed RF bands; and
  a determination, based at least on the determination that the at least one other air interface does not utilize the one or more prescribed RF bands, that the one or more prescribed RF bands are unique to the prescribed air interface;
  wherein the designation of the computerized IoT device as the type of transmitter apparatus is further based on the determination that the one or more prescribed RF bands are unique to the prescribed air interface, and comprises designation of the computerized IoT device as belonging to the prescribed air interface and a modulation associated therewith.

15. Computer readable apparatus comprising non-transitory storage medium, the non-transitory storage medium comprising at least one computer program having a plurality of instructions which are configured to, when executed on a digital processor apparatus, cause a computerized server process of a network to:
  transmit initiation command data from the computerized server process to a computerized client process associated with at least a computerized client device, the initiation command data configured to cause the computerized client process to cause a software-defined radio (SDR) apparatus of the computerized client device to scan a first radio frequency (RF) band;
  receive data relating to the first RF band from the computerized client process;
  utilize the received data to calculate one or more metrics; and
  evaluate the one or more metrics against one or more prescribed criteria to determine whether the computerized client device has been utilized to characterize a premises.

16. The computer readable apparatus of claim 15, wherein the plurality of instructions are further configured to, when executed on the digital processor apparatus, cause the computerized server process of the network to:
  register the computerized client device with the network;
  obtain a client identifier associated with the computerized client device; and
  utilize the client identifier as a first search parameter to determine whether extant Internet-of-Things (IoT) profile data for at least one of the computerized client device or the premises associated therewith exists in a database, the existence of the extant IoT profile data in the database indicative that the computerized client device has been utilized to characterize the premise.

17. The computer readable apparatus of claim 16, wherein the plurality of instructions are further configured to, when executed on the digital processor apparatus, cause the computerized server process of the network to:
  based on the determination indicating the extant IoT profile data exists in the database, transmit at least a portion of the extant IoT profile data to a cloud-based network guide function, the cloud-based network guide function configured to cause delivery of data relating to the computerized client device for rendering on a rendering device associated with the premises.

18. The computer readable apparatus of claim 16, wherein the plurality of instructions are further configured to, when executed on the digital processor apparatus, cause the computerized server process of the network to:
  based on the determination indicating the extant IoT profile data does not exist, utilize at least a MAC (media access control) address of the computerized client device utilize as a second search parameter to make a second determination of whether the extant IoT profile data exists in the database; and
  based on the second determination indicating the extant IoT profile data does not exist, generate generic IoT profile data for the computerized client device or the premises associated therewith.

19. The computer readable apparatus of claim 15, wherein:
the plurality of instructions are further configured to, when executed on the digital processor apparatus, cause the computerized server process of the network to:
evaluate the data relating to the first RF band to determine (i) a communications protocol associated with the data relating to the first RF band, and (ii) a node role for the computerized client device; and
access a database of Internet-of-Things (IoT) devices utilizing at least one of the determined communications protocol and the determined role; and
the database of IoT devices utilizing at least one of the determined communications protocol and the determined role comprises a database of device class types.

20. The computer readable apparatus of claim 19, wherein the determination of the node role for the computerized client device comprises identification of the computerized client device as either an Internet-of-Things (IoT) PAN (personal area network) coordinator, or an RFD-TX (reduced function device-transmit only) device.

21. The computer readable apparatus of claim 15, wherein:
the utilization of the received data to calculate the one or more metrics comprises:
a determination of data relating to a noise floor; and
calculation of a relative received signal strength indicator based on data relating to the noise floor to generate an index or value based on the data relating to the noise floor; and
the evaluation of the one or more metrics against the one or more prescribed criteria comprises a determination of whether the one or more metrics meets or exceeds a prescribed threshold, the determination of whether the one or more metrics meets or exceeds the prescribed threshold comprising comparing the index or value to the prescribed threshold.

* * * * *